United States Patent
Leu

(10) Patent No.: US 9,473,045 B2
(45) Date of Patent: Oct. 18, 2016

(54) SOFT-SWITCHING LOW INPUT/OUTPUT CURRENT-RIPPLE POWER INVERSION AND RECTIFICATION CIRCUITS

(71) Applicant: National Taiwan University of Science and Technology, Taipei (TW)

(72) Inventor: Ching-Shan Leu, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 70 days.

(21) Appl. No.: 14/692,727

(22) Filed: Apr. 21, 2015

(65) Prior Publication Data
US 2015/0303788 A1   Oct. 22, 2015

(30) Foreign Application Priority Data

Apr. 22, 2014 (TW) .............................. 103114534 A
Mar. 16, 2015 (TW) .............................. 104108236 A

(51) Int. Cl.
| H02M 1/44 | (2007.01) |
| H02M 7/539 | (2006.01) |
| H02M 7/217 | (2006.01) |
| H02M 7/48 | (2007.01) |
| H02M 1/00 | (2006.01) |

(52) U.S. Cl.
CPC ............... H02M 7/539 (2013.01); H02M 1/44 (2013.01); H02M 7/217 (2013.01); H02M 7/48 (2013.01); H02M 2001/0058 (2013.01); Y02B 70/1441 (2013.01); Y02B 70/1491 (2013.01)

(58) Field of Classification Search
CPC ........ H02M 7/537; H02M 1/14; H02M 7/48; H02M 7/217; H02M 1/44; Y02B 70/1491
USPC ............. 363/16–17, 37, 39, 40, 95, 97, 131; 307/18, 24, 28
See application file for complete search history.

(56) References Cited

U.S. PATENT DOCUMENTS

| 6,130,824 A * | 10/2000 | Hosotani | H02M 3/3385 363/16 |
| 6,211,579 B1 * | 4/2001 | Blair | H02M 3/33561 307/18 |
| 7,339,801 B2 * | 3/2008 | Yasumura | H02M 3/335 363/131 |
| 8,542,509 B2 * | 9/2013 | Sagneri | H02M 3/158 363/69 |
| 8,665,616 B2 * | 3/2014 | Leu | H02M 7/537 363/131 |

* cited by examiner

Primary Examiner — Rajnikant Patel
(74) Attorney, Agent, or Firm — CKC & Partners Co., Ltd.

(57) ABSTRACT

A soft-switching and low input current ripple power inversion circuit, in which the inversion circuit is connected in parallel to an input DC voltage source and includes a top cell, a bottom cell and at least one transformer, in which the top cell and the bottom cell have its individual impedance adjusting unit of which the impedance can easily be adjusted to obtain the required equivalent resonant inductance or capacitance. Thus, the semiconducting switches therein can be soft-switched alternately to reduce the switching loss. Moreover, the inversion circuit can be modified by adding at least one middle cell inserted between the top cell and the bottom cell to reduce the voltage stress on the semiconductor switch. Consequently, low voltage rating semiconductor switch accompanied with lower RDS(on), conduction losses can be reduced to improve the converter efficiency.

19 Claims, 36 Drawing Sheets

SOFT-SWITCHING LOW INPUT/OUTPUT CURRENT-RIPPLE POWER INVERSION AND RECTIFICATION CIRCUITS

RELATED APPLICATIONS

This application claims priorities to Taiwan Application Serial Number 103114534, filed Apr. 22, 2014, and Taiwan Application Serial Number 104108236, filed Mar. 16, 2015, which are herein incorporated by references.

FIELD OF THE INVENTION

The present invention relates to power inversion and rectification circuits, more particularly to power inversion and rectification circuits having soft-switching operation and low current ripple performance. Consequently, the switching losses are significantly reduced to improve the power conversion efficiency.

BACKGROUND OF THE INVENTION

DC-DC converter is widely used in today's electrical device. By using an inversion circuit cascaded with a rectification circuit and a filter circuit, the DC voltage is inverted to an AC voltage and the AC voltage is then rectified and filtered to the required DC voltage.

Among several inversion topologies, the half-bridge converter (HBC) has low voltage stress on semiconductors so that it is widely used for high input-voltage low-to-medium power inversion applications.

However, half-bridge topology has a pulsating input current waveform, which is a common characteristic of buck-derived converters. This pulsating input current generates high di/dt (rate of current change) noise. In addition to dv/dt noise, this di/dt noise becomes another key inducing factor of the electromagnetic interference (EMI) problem. Consequently, a large input filter must be added to meet the EMI regulation, which increases the cost and occupies space in the converter.

To reduce input current-ripple with its related di/dt noises, several ripple reduction converters have been invented recently, such as in U.S. Pat. No. 7,515,439, issued on Apr. 7, 2009 in U.S. Pat. No. 7,957,161, issued on Jun. 7, 2011, U.S. Pat. No. 8,259,469, issued on Sep. 4, 2012, and U.S. Pat. No. 8,665,616, issued on Mar. 4, 2014, all to the inventor of the present invention.

Among them, the half-bridge converter with input current ripple reduction (HBC-CRR) preserves the advantages of the HBC through the use of a current ripple reduction mechanism as shown in FIG. 2 and FIG. 3(b) of the U.S. Pat. No. 8,665,616. Therefore, smaller components of the EMI filter stage can be used instead.

However, the HBC-CRR employs symmetrical control scheme to regulate the output voltage resulting in varying the dead-time interval under different line and load operating conditions. Consequently, it operates with hard-switching resulting in higher switching losses. The operating frequency is thus limited and the reactive components, such as inductor and capacitor, are unable to reduce their size. It hinders to achieve high power density performance.

Without compromising the converter efficiency, therefore, zero-voltage switching operation should be incorporated with the HBC-CRR so that the switching frequency can be increased. However, it has not been explored yet and becomes the motivation of the present invention.

To enable a ZVS operation, two operating conditions should be met: (1) a fixed dead time between the two control driver signals, and (2) a sufficiently large energy transition between the leakage inductance (or magnetizing inductance) and the output capacitance of the MOSFET.

Among several control schemes, the required fixed dead time can be obtained by using the asymmetrical pulse-width-modulation (APWM) control or near 50% duty cycle variable frequency (VF) control schemes. Consequently, the HBC-CRR will feature the desirable zero-voltage switching operation if either one of the APWM or VF control scheme is applied.

Moreover, minimizing the conduction loss of the MOSFETs becomes another motivation of the present invention. It can be obtained by taking the advantage of lower equivalent $R_{DS(on)}$ (i.e. the resistance when MOSFET is turned-on) with two low-voltage rating MOSFETs connected in series. The conduction losses are thus reduced and the efficiency of the converter is improved.

In addition to having low input current-ripple performance, the present invention is directed to disclose inversion circuits and their corresponding low output current ripple rectification circuits with additional enhanced soft-switching operation performance accordingly.

SUMMARY OF THE INVENTION

An object of the present invention is to provide a switching mode power converter having an inversion or rectification circuit with low input or output current ripple.

Another object of the present invention is to utilize the leakage inductance of the transformer and the stray capacitance of the MOSFET as a lossless snubber, thereby the leakage inductance energies are effectively absorbed and recycled to improve overall performance.

Another object of the present invention is to provide a switching mode power converter having an inversion or rectification circuit with soft-switching operation on semiconductor switches (MOSFETs) or rectifier diodes resulting in reducing the switching losses. Consequently, further efficiency improvements can be achieved.

A further object of the present invention is to provide a switching mode power converter having an inversion or rectification circuit with low voltage rating semiconductor switches (MOSFETs) accompanied with lower $R_{DS(on)}$ or rectifier diodes with lower forward voltage drop resulting in reducing the conduction losses. Consequently, further efficiency improvements can be achieved.

Other objects, advantages, and novel features of the invention will become more apparent from the following detailed description when taken in conjunction with the accompanying drawings.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF PREFERRED EMBODIMENTS

Figure 1:
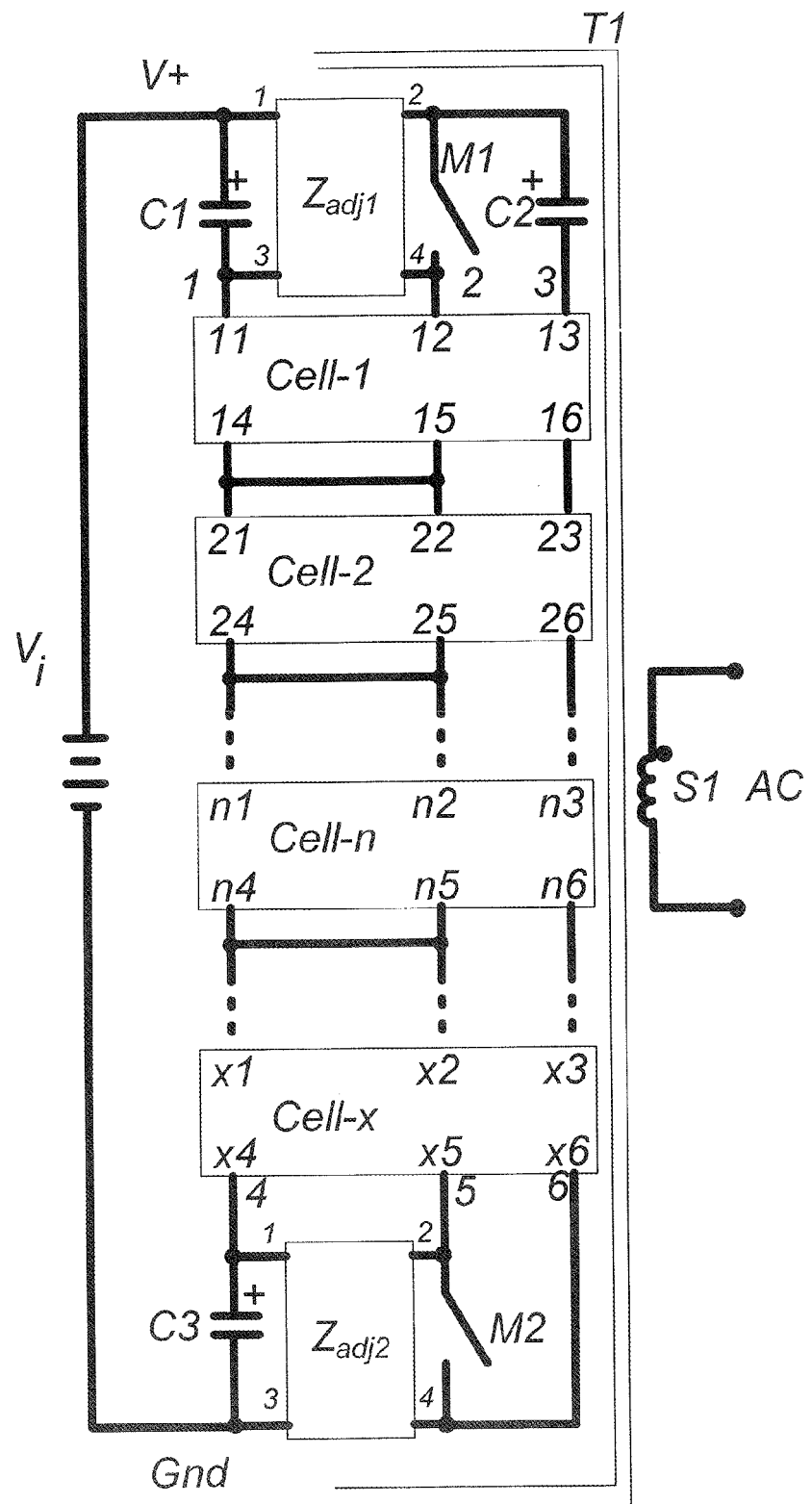
FIG. 1(a) to FIG. 1(e) is the circuit diagram of a single-transformer soft-switching DC-AC inversion circuit and its sub-circuit of nth middle-cell Cell-n applied thereto according to the first embodiment of the present invention.
Figure 1:
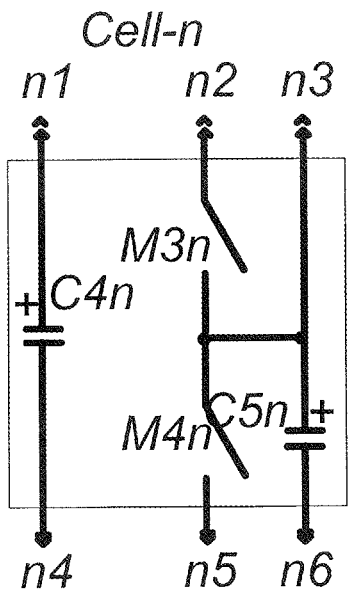
Figure 1:
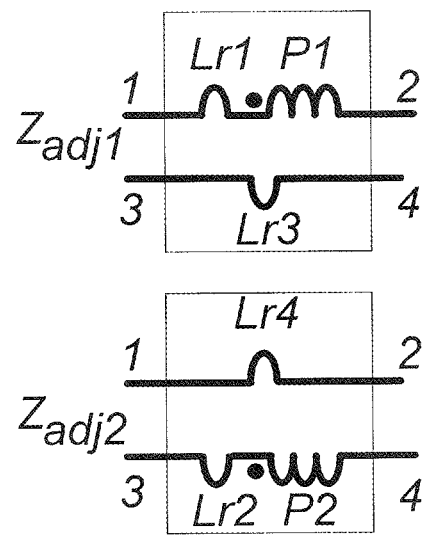
Figure 1:
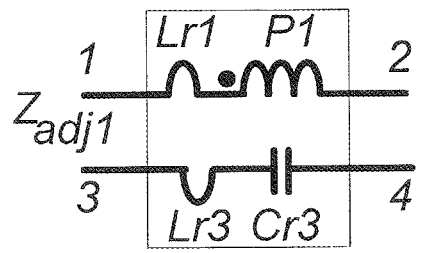
Figure 1:
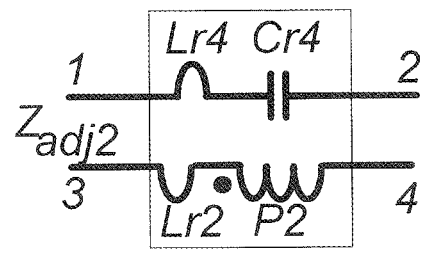
Figure 1:
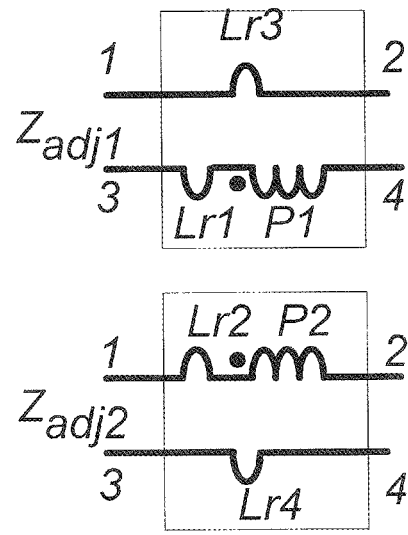

To achieve the foregoing objectives, a family of single-transformer soft-switching low input current ripple inversion circuit as the first embodiment of the present invention is illustrated in FIG. 1(a). It is paralleled-connected with the DC input voltage source Vi and converts DC voltage to an output AC voltage via a transformer. The circuit includes one top-cell (having four terminals labeled as in, 1, 2, 3, and 4), without or with several middle-cells (wherein nth middle-cell is labeled as Cell-n and has six terminals labeled as n1, n2, n3, n4, n5, and n6) and one bottom-cell (having four terminals labeled as GND, 4, 5, and 6) series-connected sequentially. Without middle-cell, the top-cell is series connnected to the bottom-cell. On the other hand, several middle-cells (Cell-1~Cell-x) can be inserted between the top-cell and the bottom-cell to reduce the voltage stress of the switches as shown in FIG. 1(a).

As shown, the top-cell includes two clamping capacitors (C1 and C2), the first impedance adjusting unit Zadj1 and the first semiconductor switch M1, wherein Zadj1 has four terminals 1, 2, 3, and 4. The terminal 1 of the Zadj1, the positive node of the input DC voltage (positive node V+), and the upper node of the capacitor C1 are connected together. The terminal 2 of the Zadj1, the upper terminals of the M1 and the clamp capacitor C2 are connected together. The terminal 3 of the Zadj1 and the lower terminal of the clamp capacitor C1 are connected together. The terminal 4 of the Zadj1 and the lower node of the M1 are connected together. The lower nodes of the capacitor C1, the M1, and the second clamp capacitor C2 are respectively connected to the terminals 11, 12, and 13 of the first middle-cell-1.

The bottom-cell includes a third clamp capacitor C3, a second impedance adjusting unit Zadj2 and a second semiconductor switch M2, wherein the Zadj2 has four terminals 1, 2, 3, and 4. The terminal 1 of the Zadj2 and the upper node of the clamp capacitor C3 are connected together. The terminal 2 of the Zadj2 and the upper node of the M2 are connected together. The terminal 3 of the Zadj2, the negative node of the input DC voltage (negative node GND), and the lower node of the capacitor C3 are connected together. The terminal 4 of the Zadj2 and the lower node of the M2 are connected together. The upper nodes of the capacitor C3, the M2, and the lower node of the M2 are respectively connected to the terminals x4, x5, and x6 of the last middle-cell-x.

Referring to FIG. 1(b), the nth middle-cell Cell-n is realized by two clamping capacitors C4n and C5n, and two switches M3n and M4n. Terminals n1 and n2 of the nth middle-cell Cell-n are respectively connected to the upper nodes of the clamping capacitor C4n and the switch M3n. Terminal n3 of the nth middle-cell Cell-n is connected to the lower node of the switch M3n, the upper node of the switch M4n, and the upper node of the clamping capacitor C5n. Terminals n4, n5 and n6 of the nth middle-cell Cell-n are respectively connected to the lower nodes of the clamping capacitor C4n, the switch M4n, and the clamping capacitor C5n.

Referring to FIG. 1(a), the terminals n1, n2, and n3 of the nth middle-cell Cell-n are respectively connected to terminals (n−1)4, (n−1)5 and (n−1)6 of the previous middle-cell Cell-(n−1). Moreover, the terminals n4, n5, and n6 of the nth middle-cell Cell-n are respectively connected to terminals (n+1)1, (n+1)2, (n+1)3 of the next middle-cell Cell-(n+1). If more than two middle-cells are sequentially connected between the top-cell and the bottom-cell, the terminals 4 and 5 of each middle-cell are connected together. However, this connection doesn't apply to the last middle-cell (Cell-x).

The switches shown in FIG. 1(a) and FIG. 1(b) are thus divided into two sets; M1-M31-M32- . . . -M3n and M2-M41-M42- . . . -M4n. The switches in same set are turned on and turned off simultaneously. Employing the asymmetrical pulse-width-modulation (APWM) control or near 50% duty cycle variable frequency (VF) control schemes, two complementary sets of driver signals with a fixed dead-time interval are issued by a controller (not shown) to turn on or turn off the corresponding switch within one switching cycle. Consequently, a fixed dead time is provided and ZVS operation can be achieved.

As shown in FIG. 1(a), a single transformer T1 includes two identical primary windings P1 and P2 and at least one secondary winding S1. The first inductor Lr1 and the second inductor Lr2 represent the respective leakage inductance of the primary windings P1 and P2.

To achieve substantial ripple reduction and a wide ZVS operating range, two larger identical leakage inductances Lr1 and Lr2 are required. However, it is difficult to implement the required leakage inductance during transformer construction. Therefore, minimizing each leakage inductance with adding external large resonant inductor, Lr3 and Lr4, is a more practical solution as shown in FIG. 1(c) to FIG. 1(e). As shown in FIG. 1(d), moreover, two capacitors Cr3 and Cr4 are also added to be as a voltage source with the APWM (asymmetrical pulse-width-modulation) control scheme or as a resonant capacitor with near 50% duty cycle variable frequency control scheme. Therefore, a broad range ZVS operation can be achieved.

By using the configuration of the Zadj1 and the Zadj2 as shown in FIG. 1(c), FIG. 1(a) is the first member of the single-transformer soft-switching low input current ripple inversion circuit of the present invention. As shown, the Lr1 and P1 are series-connected between the terminals 1 and 2 of the Zadj1. The third inductor Lr3 is connected between the terminals 3 and 4 of the Zadj1. The fourth inductor Lr4 is connected between the terminals 1 and 2 of the Zadj2. The Lr2 and P2 are series-connected between the terminals 3 and 4 of the Zadj2. The Lr3 and the Lr4 can be implemented with two separate inductors or a two-winding coupling inductor.

By using the configuration of the Zadj1 and the Zadj2 as shown in FIG. 1 (d), FIG. 1(a) is the second member of the single-transformer soft-switching low input current ripple inversion circuit of the present invention. As shown, the Lr1 and P1 are series-connected between the terminals 1 and 2 of the Zadj1. The third inductor Lr3 and the sixth capacitor Cr3 are connected between the terminals 3 and 4 of the Zadj1. The fourth inductor Lr4 and seventh capacitor Cr4 are connected between the terminals 1 and 2 of the Zadj2. The Lr2 and P2 are series-connected between the terminals 3 and 4 of the Zadj2. The Lr3 and the Lr4 can be implemented with two separate inductors or a two-winding coupling inductor.

By using the configuration of the Zadj1 and the Zadj2 as shown in FIG. 1 (e), FIG. 1(a) is the third member of the single-transformer soft-switching low input current ripple inversion circuit of the present invention. As shown, the third inductor Lr3 is connected between the terminals 1 and 2 of the Zadj1. The Lr1 and P1 are series-connected between the terminals 3 and 4 of the Zadj1. The Lr2 and P2 are series-connected between the terminals 1 and 2 of the Zadj2. The fourth inductor Lr4 is connected between the terminals 3 and 4 of the Zadj2. The Lr3 and the Lr4 can be implemented with two separate inductors or a two-winding coupling inductor.

Three implementations of the DC-AC inversion circuit, with none or one or more middle-cell inserted between the top-cell and bottom-cell are possible for different input voltage and power applications.

The first DC-AC inversion circuit is realized with series-connected the top-cell and the bottom-cell. The Lr3 and/or Cr3 in the Zadj1 and the Lr4 and/or Cr4 of the Zadj2 can be shared as an inductor Lr and/or a capacitor Cr.

The second DC-AC inversion circuit is realized with the top-cell, one middle-cell, and the bottom-cell connected in series. The Lr3 and/or Cr3 in the Zadj1 and the Lr4 and/or Cr4 of the Zadj2 can be realized with the configurations as shown in FIG. 1(c) to FIG. 1(e).

The third DC-AC inversion circuit is realized with the top-cell, n (n≥2) middle-cells, and the bottom-cell connected in series. Besides the connection among the top-cell, middle-cells, and bottom-cell, the terminals 14 and 15 of the first middle-cell, the terminals 24 and 25 of the second middle-cell, and up to the terminals (n−1)4 and (n−1)5 of the (n−1) middle-cell are connected together. The Lr3 and/or Cr3 in the Zadj1 and the Lr4 and/or Cr4 of the Zadj2 can be realized with the configurations as shown in FIG. 1(c) to FIG. 1(e).

Figure 2:
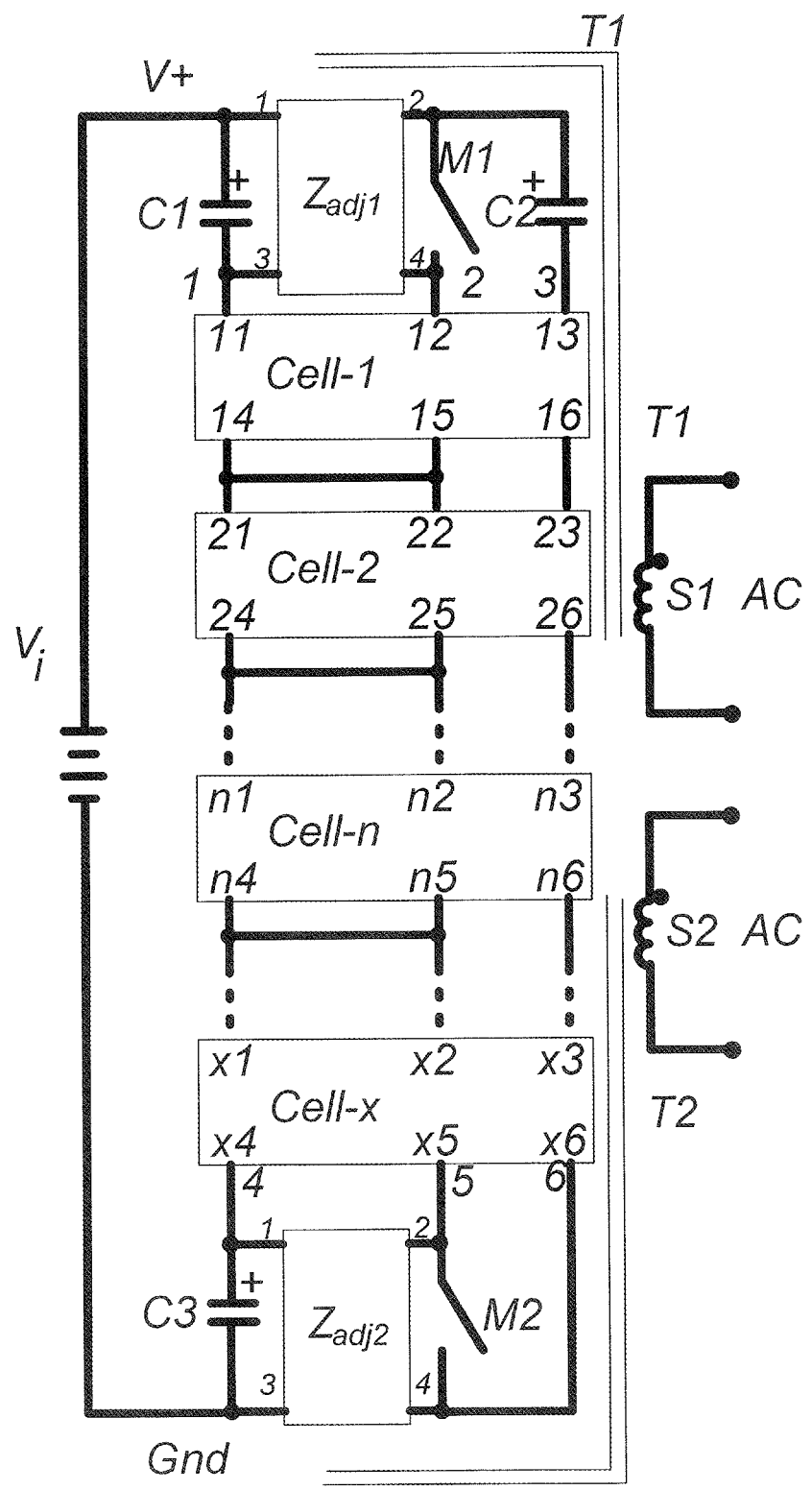
FIG. 2(a) to FIG. 2(e) is the circuit diagram of a two-transformer soft-switching DC-AC inversion circuits with its sub-circuits of nth middle-cell Cell-n applied thereto according to the first embodiment of the present invention.
Figure 2:
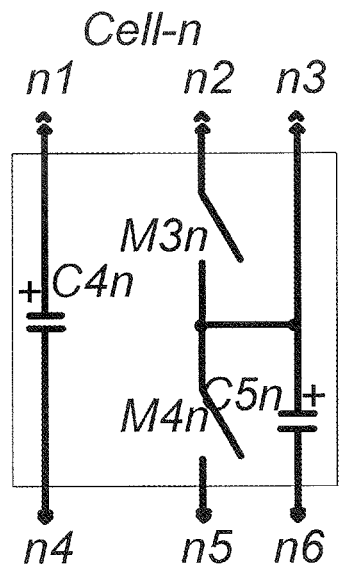
Figure 2:
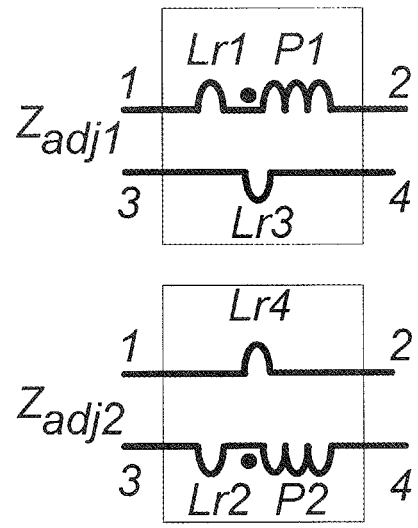
Figure 2:
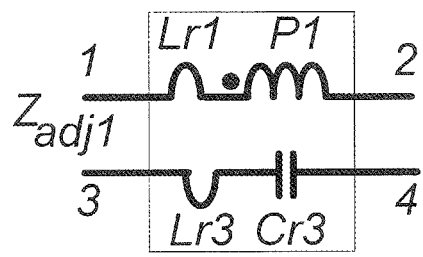
Figure 2:
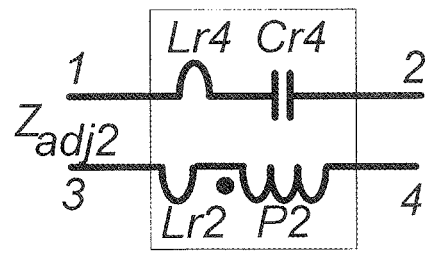
Figure 2:
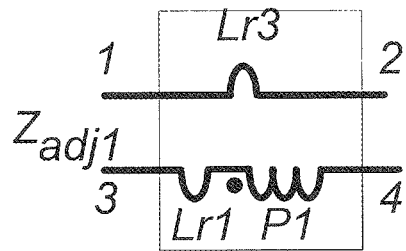
Figure 2:
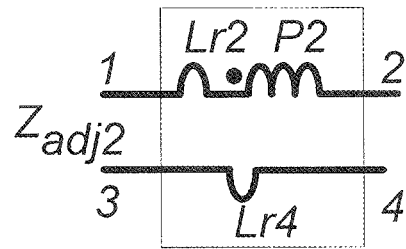

To increase the output power, moreover, the single transformer T1 can be replaced with two transformers T1 and T2. Each transformer has one primary winding and at least one secondary winding being electrically connected in parallel or series to produce the AC output as shown in FIG. 2(a). The inductor Lr1 (Lr2) represents the leakage inductance of primary winding P1 (P2).

If a DC output voltage is required to a load, additional rectified and filtered stages (not shown) are needed.

Because both circuits in FIG. 1(a) and FIG. 2(a) share the same operating characteristics, consequently, the first embodiment of the present invention will be disclosed by using a single transformer DC-AC inversion circuits only.

Figure 3:
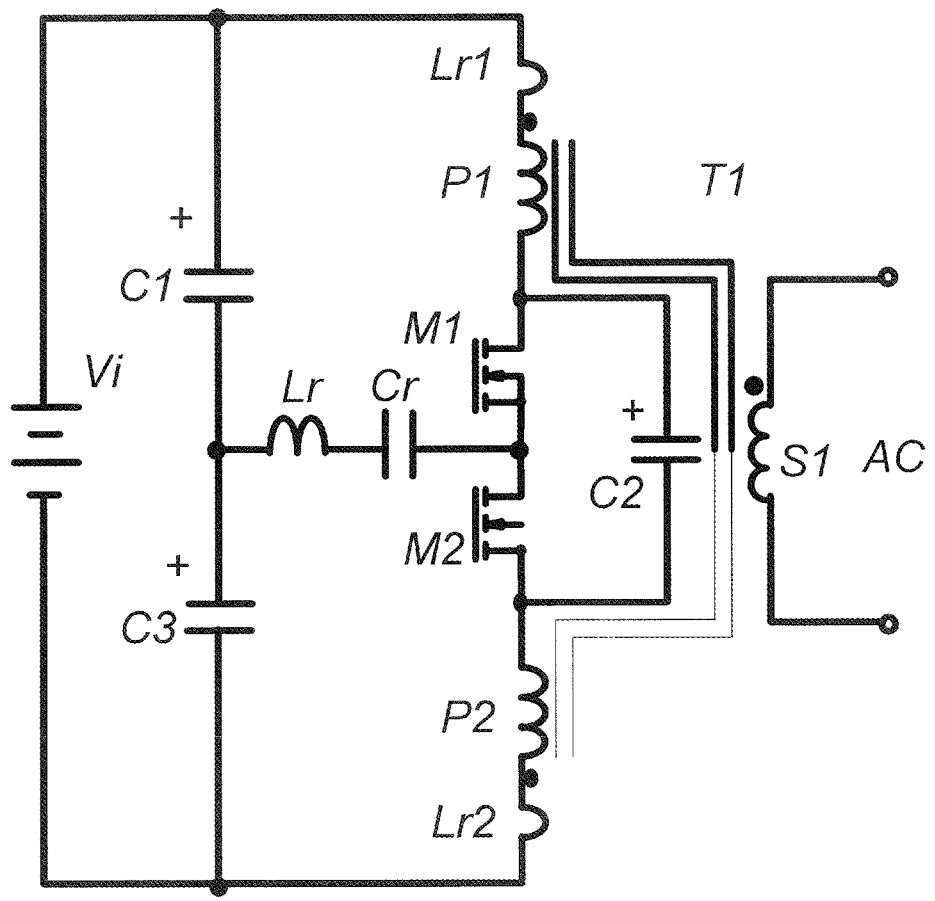
FIG. 3 is an example circuit diagram of the DC-AC inversion circuit shown in FIG. 1(a) wherein the circuit is realized with Zadj1 and Zadj2. The Lr-Cr network represents the combination of the Lr3-Cr3 (Zadj1) and the Lr4-Cr4 (Zadj2)
Figure 4:
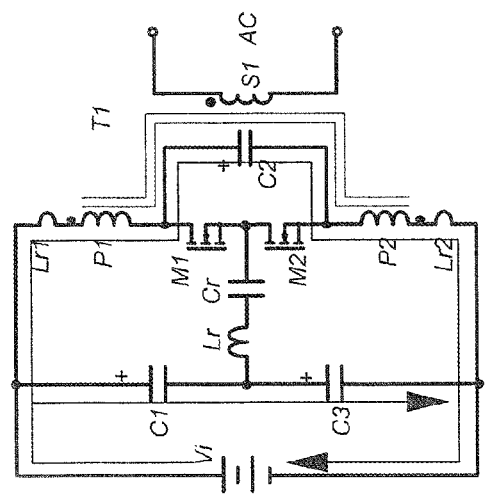
FIG. 4(a) to FIG. 4(d) shows the equivalent circuit of the DC-AC inversion circuit shown in FIG. 3 when the switches are turned on and turned off, respectively.
Figure 4:
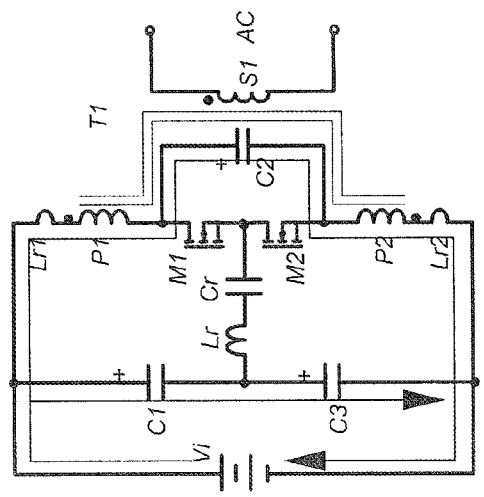
Figure 4:
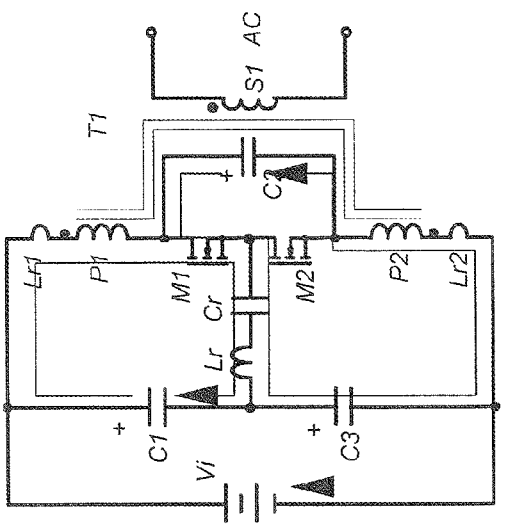
Figure 4:
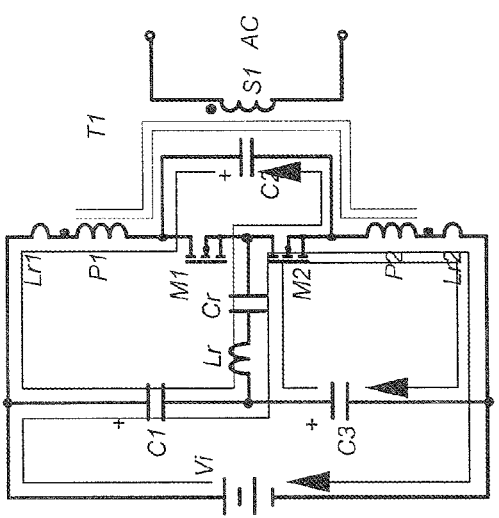

In accordance with the present invention, power inversion circuit of an application example of the first embodiment and its operating stages are illustrated as shown in FIG. 3 and FIG. 4, respectively. It is constructed with the top-cell and the bottom-cell connected in series. The MOSFETs (M1-M2) shown in FIG. 3 and FIG. 4 are equivalent to the switches (M1-M2) shown in FIG. 1(a). The Lr3-Cr3 in the Zadj1 and the Lr4-Cr4 of the Zadj2 can be shared with Lr-Cr.

Assumed that the clamping capacitors C1 and C3 are identical, the voltages across the clamping capacitors C1 and C3 are equal to one-half DC input voltage Vi. Thus, as shown in FIG. 4(a) to FIG. 4(d), there are four operation stages within one switching cycle during steady-state operation.

As shown in FIG. 4(a), gate drive signal (not shown) is issued to turn on the MOSFET M1 during the first time interval. Three one-half input voltages are provided to the P1, P2, Lr, and Cr via the following routes labeled by the marks of the elements thereof sequentially:
(1) Vi(+)-Lr1-P1-M1-Cr-Lr-C3-Vi(−);
(2) C1(+)-Lr1-P1-M1-Cr-Lr-C1(−); and
(3) C2(+)-M1-Cr-Lr-C3-Lr2-P2-C2(−),
wherein the clamping capacitor C1 and clamping capacitor C2 are discharged while the capacitor C3 is charged during the first time interval.

As shown in FIG. 4(b), the gate drive signal (not shown) is issued to turn off the MOSFETs M1 during a second time interval (a fixed dead-time interval). The clamping capacitors C2 is charged by the input voltage Vi and the energies stored in the leakage inductances of the transformer T1. Due to the volt-second balance applied to both the first and second primary windings P1 and P2, the average voltage across the clamping capacitor C2 is equal to the input voltage Vi. The leakage energies are absorbed resulting in having spike-free voltage waveform on the MOSFET M1.

As shown in FIG. 4(c), gate drive signal (not shown) is issued to turn on the MOSFET M2 during a third time interval. Three one-half of input voltages are provided to the P1, P2, Lr, and Cr via the following routes labeled by the marks of the elements thereof sequentially:
(1) Vi(+)-C1-Lr-Cr-M2-P2-Lr2-Vin(−);
(2) C3(+)-Lr-Cr-M2-P2-Lr2-C3(−); and
(3) C2(+)-P1-Lr1-C1-Lr-Cr-M2-C2(−),
wherein the clamping capacitors C2 and C3 are discharged while the capacitor C1 is charged during the third time interval.

As shown in FIG. 4(d), the gate drive signal (not shown) is issued to turn off the second MOSFET M2. The clamping capacitors C2 is charged by the input voltage Vi and the energies stored in the leakage inductances of the transformer T1. Due to the volt-second balance applied to both the first and second primary windings P1 and P2, the average voltage across the clamping capacitors C2 is equal to the input voltage Vi. The leakage energies are absorbed resulting in having spike-free voltage waveform on the MOSFET M2.

As an enhancement of the embodiment, the switches installed in the power inversion circuit shown in FIG. 3 may be other active semiconductor switches other than the MOSFETs M1 and M2 mentioned above.

Figure 5:
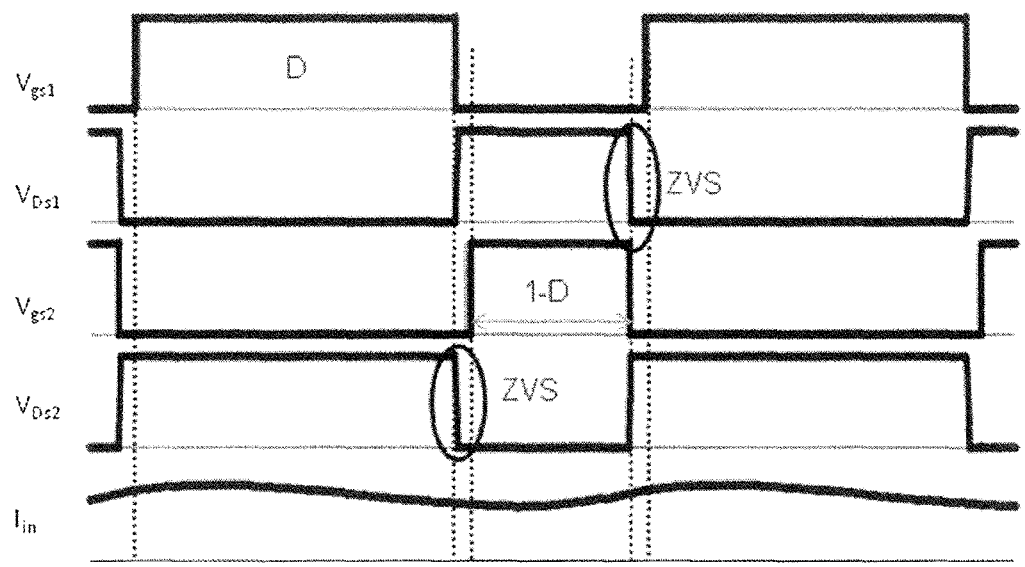
FIG. 5 shows several key waveforms of the circuit shown in FIG. 3 with asymmetrical pulse-width-modulation control scheme.

Several key waveforms of the power inversion circuit of the example of the first present invention are shown in FIG. 5. These waveforms are obtained by using simulation program SIMPLIS with APWM control scheme.

Figure 6A:
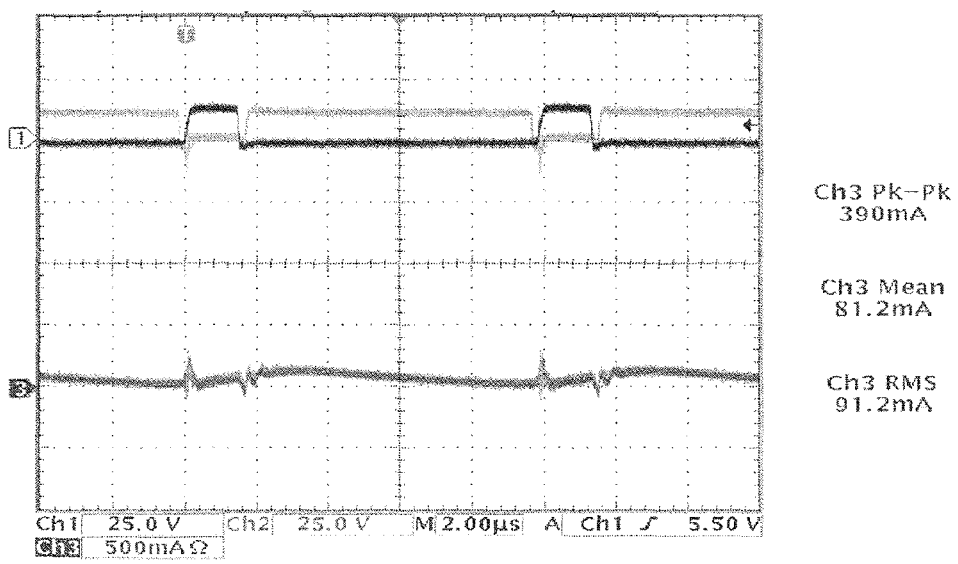
FIG. 6(a) and FIG. 6(b) show the input current waveforms measured from hardware experiment of the circuit shown in FIG. 3 with asymmetrical pulse-width-modulation control scheme under two different operating conditions.
Figure 6B:
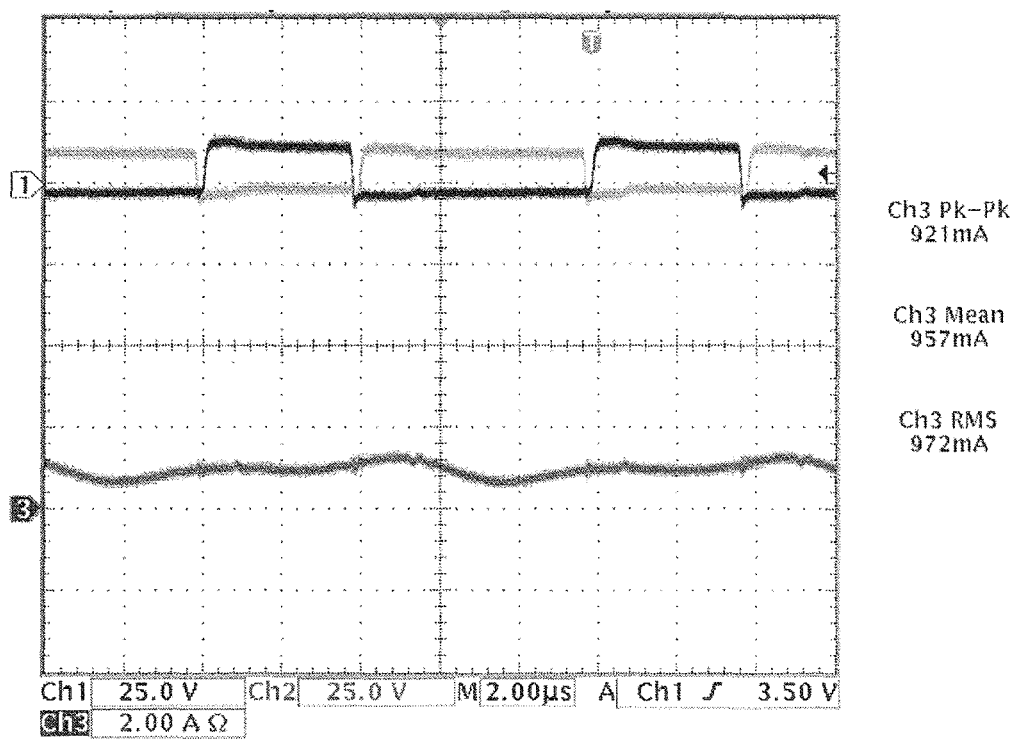
Figure 7:
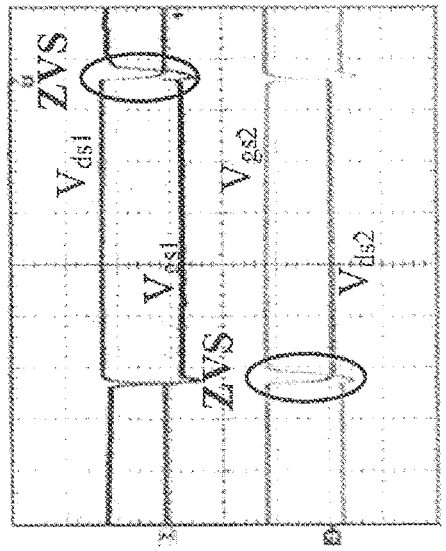
FIG. 7(a) to FIG. 7(d) show the ZVS MOSFET voltage waveforms measured from hardware experiment of the circuit shown in FIG. 3 with asymmetrical pulse-width-modulation control scheme under four different operating conditions.
Figure 7:
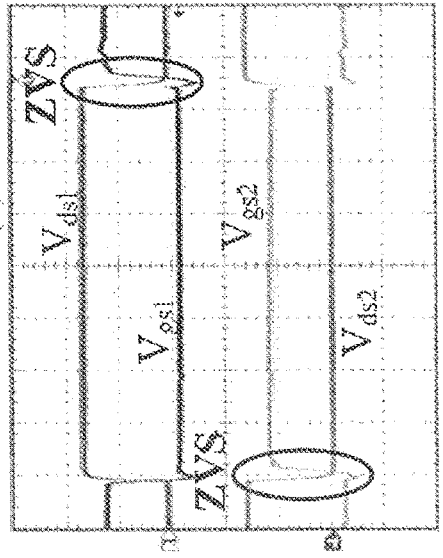
Figure 7:
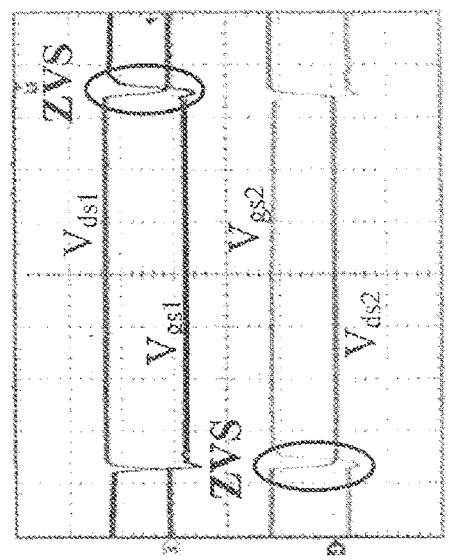
Figure 7:
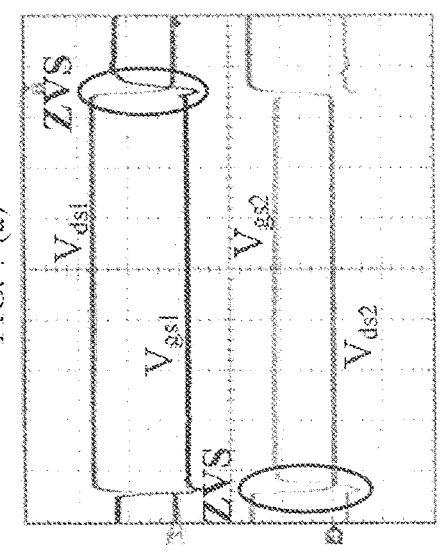

Moreover, the operating characteristics are also verified by the experimental results. Input current waveforms are obtained with high-line light-load, and low-line full-load operating conditions, as shown in FIG. 6(a) and FIG. 6(b), respectively. Both waveforms are non-pulsating with small current ripple. As a result, a smaller electromagnetic interference (EMI) filter can be used to meet the EMI regulation.

In addition, ZVS operations are achieved under low-line 40% load, low-line full-load, high-line 60% load, high-line full-load operating conditions as shown in FIG. 7(a), FIG. 7(b), FIG. 7(c), and FIG. 7(d), respectively.

Figure 8:
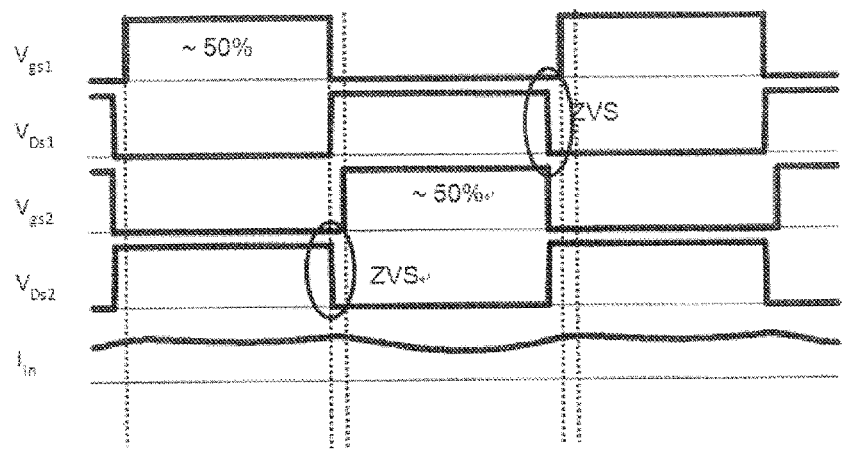
FIG. 8 shows several key waveforms of the circuit shown in FIG. 3 with near 50% variable frequency control scheme.

Employing near 50% duty cycle control scheme, several key waveforms of the power inversion circuit of the example of the first present invention are shown in FIG. 8. In addition to preserving non-pulsating input current waveform, the Vds1 and Vds2 are also turned on with ZVS operating condition.

Figure 9:
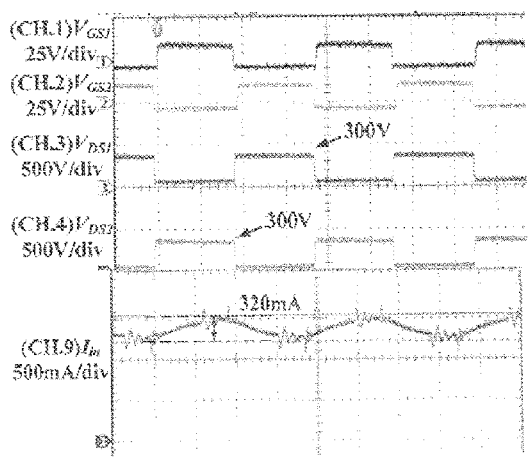
FIG. 9(a) to FIG. 9(b) shows the input current waveforms measured from hardware experiment of the circuit shown in FIG. 3 with near 50% variable frequency control scheme under two different operating conditions.
Figure 9:
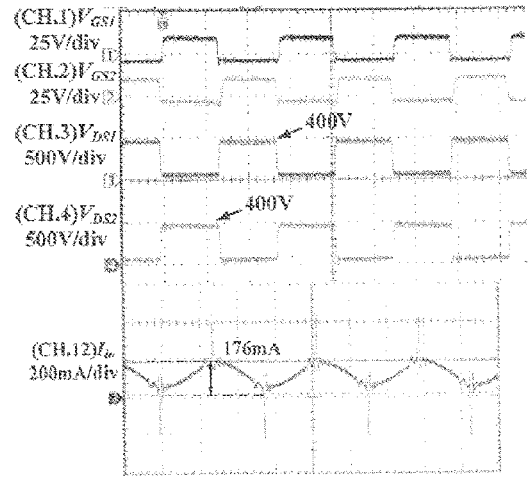
Figure 10:
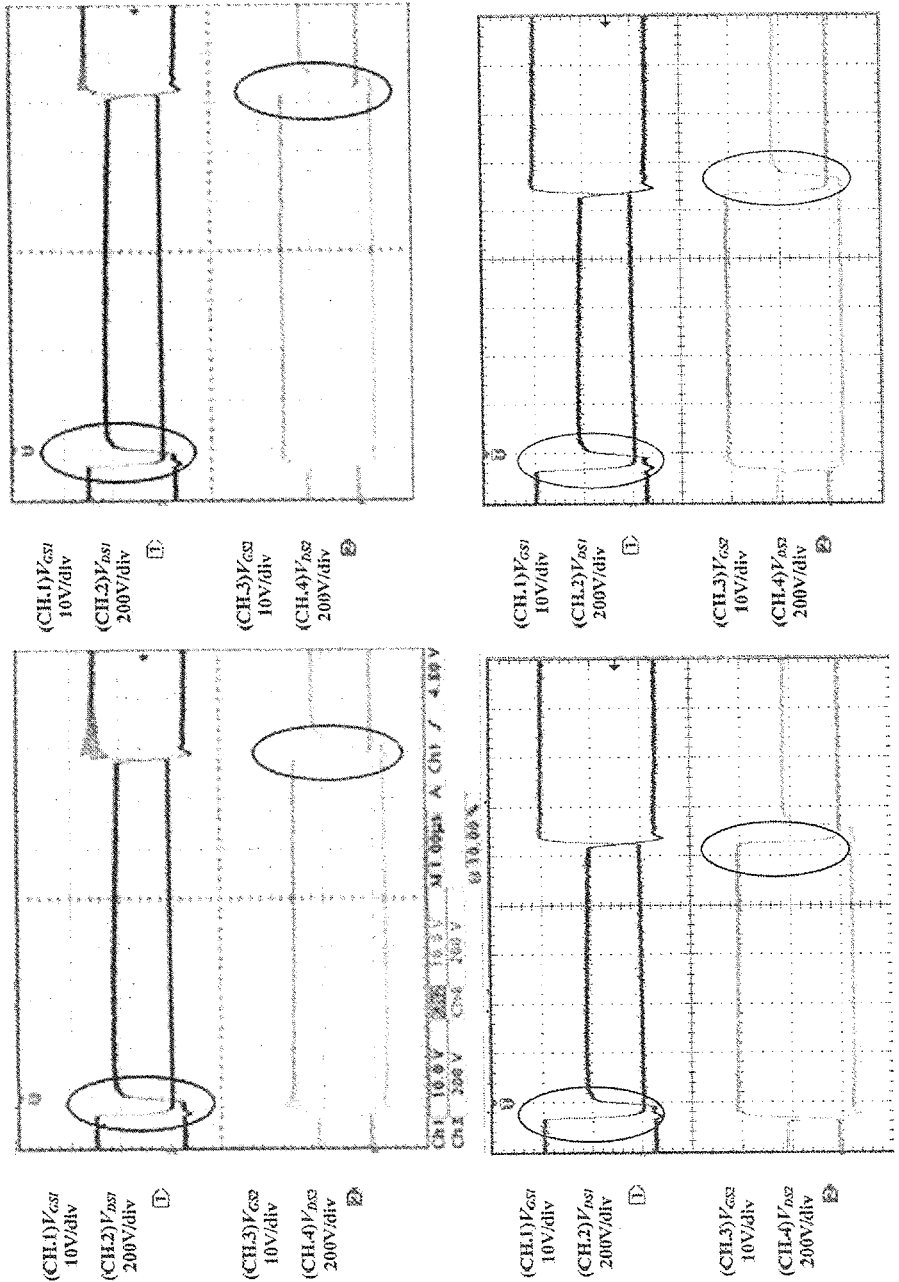
FIG. 10 shows the ZVS MOSFET voltage waveforms measured from hardware experiment of the circuit shown in FIG. 3 with near 50% variable frequency control scheme under four different operating conditions.

Moreover, the operating characteristics are also verified by the experimental results. The input current waveforms are measured under low-line full-load and high-line light-load operation conditions as shown in FIG. 9(a) and FIG. 9(b), respectively. As a result, a smaller electromagnetic interference (EMI) filter can be used to meet the EMI regulation.

Under different line and load operation conditions, ZVS operations are achieved under low-line light-load, low-line full-load, high-line light-load, high-line full-load operating conditions as shown in FIG. 10(a), FIG. 10(b), FIG. 10(c), and FIG. 10(d), respectively.

Figure 11:
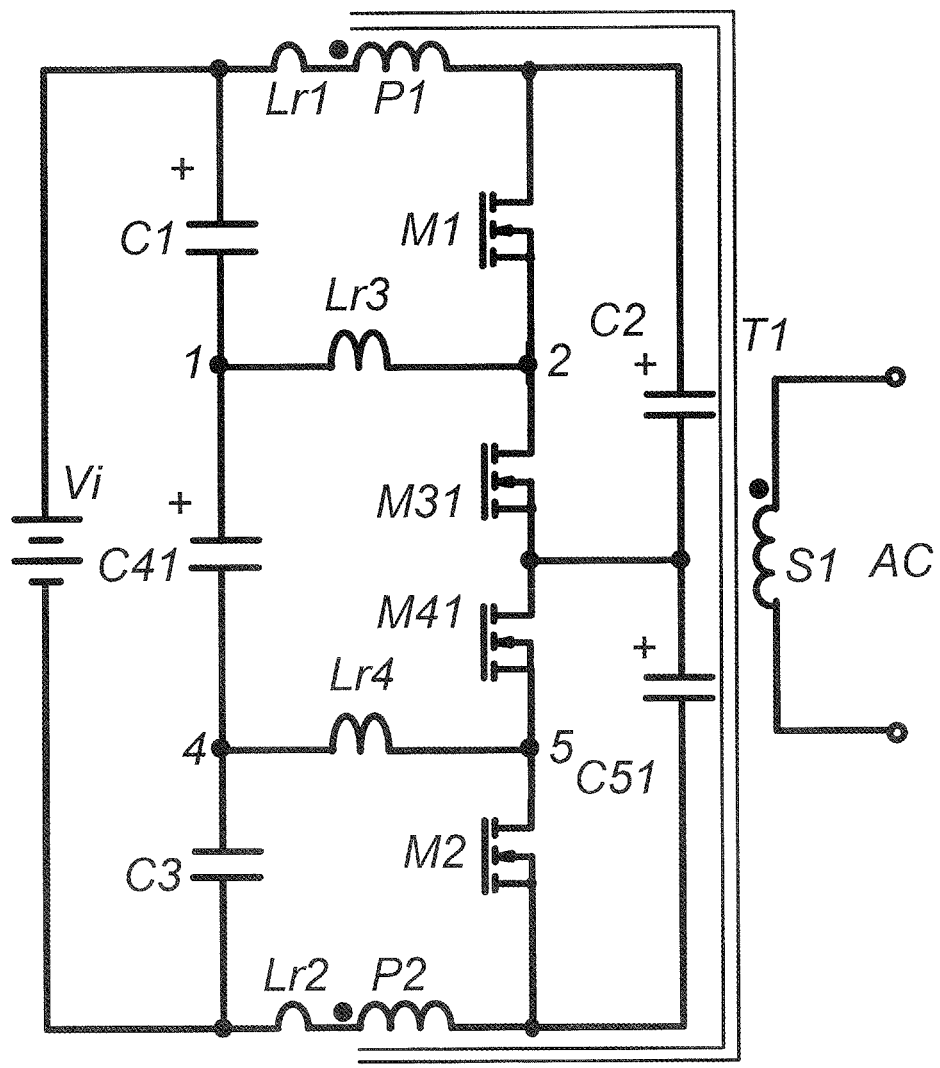
FIG. 11 is an example circuit diagram of the DC-AC inversion circuit shown in FIG. 1(a) wherein the circuit is realized with Zadj1, Zadj2, and one middle-cell.

Moreover, the power inversion circuit is constructed with the top-cell, one middle-Cell, and the bottom-cell as shown in FIG. 11. The MOSFETs M1, M31, M2, and M41 are used as switches equivalent to the switches M1, M3n, M2, and M4n (i.e. n=1) shown in FIG. 1(a). Assumed that the clamping capacitors C1 and C3 are identical, the voltages across the clamping capacitors C1 and C3 are equal to one-quarter DC input voltage Vi. Thus, as shown in FIG. 12(a) to FIG. 12(d), there are four operation stages within one switching cycle during steady-state operation.

Figure 12:
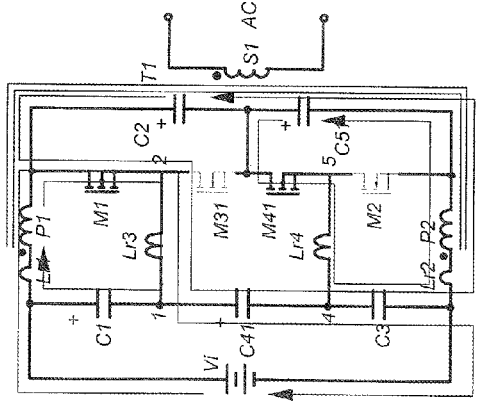
FIG. 12(a) to FIG. 12(d) shows the equivalent circuit of the DC-AC inversion circuit shown in FIG. 11 when the switches are turned on and turned off, respectively.
Figure 12:
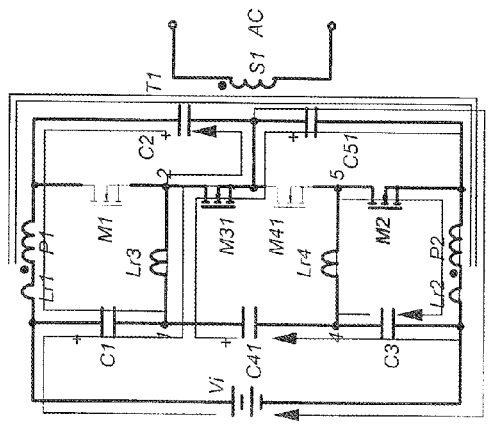
Figure 12:
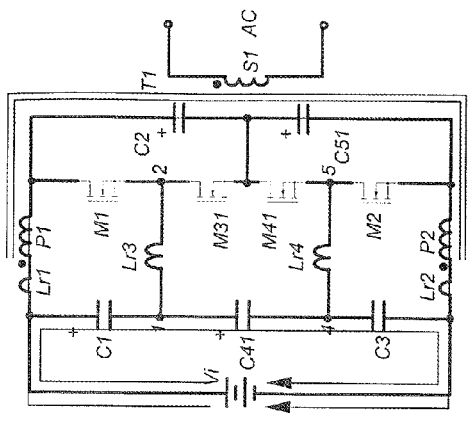
Figure 12:
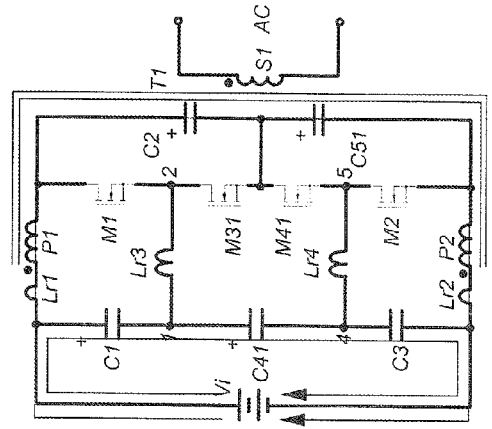

As shown in FIG. 12(a), gate drive signals (not shown) are issued to turn on the MOSFET M1 and M41 during the first time interval. Four one-quarter input voltages are provided to the P1, P2, Cr, and. Lr via the following routes labeled by the marks of the elements thereof sequentially:
(1) Vi(+)-Lr1-P1-M1-Lr3-C41-C3-Vin(−);
(2) C1(+)-Lr1-P1-M1-Lr3-C1(−);
(3) C2(+)-M1-Lr3-C41-C3-Lr2-P2-C51(−)-C51(+)-C2(−); and
(4) C51(+)-M41-Lr4-C3-Lr2-P2-C51(−)°
wherein the clamping capacitors C1, C2 and C51 are discharged while the capacitor C3 and C41 are charged during the first time interval.

As shown in FIG. 12(b), the gate drive signals (not shown) are issued to turn off the MOSFETs M1 and M41 during a second time interval (dead-time interval). The clamping capacitors C2 and C51 are charged by the input voltage Vi and the energies stored in the leakage inductances of the transformer T1. Due to the volt-second balance applied to both the first and second primary windings P1 and P2, the average voltages across the clamping capacitors C2 and C51 (assumed C2=C51) are equal to one-half input voltage Vi. The leakage energies are absorbed resulting in having spike-free voltage waveform on the MOSFET M1 and M41.

The average voltages across C2, C51 and C41 are equal to one-half DC input voltage and the average voltages across C1 and C3 are equal to one-quarter DC input voltage.

As shown in FIG. 12(c), gate drive signals (not shown) are issued to turn on the MOSFETs M2 and M31 during a third time interval. Four one-quarter input voltages are provided to the P1, P2, Cr, and Lr via the following routes labeled by the marks of the elements thereof sequentially:

(1) Vi(+)-C1-Lr3-M31-C51-P2-Lr2-Vin(−);
(2) C2(+)-P1-Lr1-C1-Lr3-M31-C2(−);
(3) C3(+)-Lr4-M2-P2-Lr2-C3(−); and
(4) C3(+)-C41-Lr3-M31-C51-P2-Lr2-C3(−), wherein the clamping capacitors C2, C3 and C41 are discharged while the capacitors C1 and C51 are charged during the third time interval.

As shown in FIG. 12(d), the gate drive signals (not shown) are issued to turn off the MOSFETs M2 and M31 (dead-time interval). The clamping capacitors C2 and C51 are charged by the input voltage Vi and the energies stored in the leakage inductances of the transformer T1. Due to the volt-second balance applied to both the first and second primary windings P1 and P2, the average voltages across the clamping capacitors C2 and C51 (assumed C2=C51) are equal to one-half input voltage Vi. The leakage energies are absorbed resulting in having spike-free voltage waveform on the MOSFET M2 and M31.

The average voltages across C2, C51 and C41 are equal to one-half DC input voltage and the average voltages across C1 and C3 are equal to one-quarter DC input voltage.

As an enhancement of the embodiment, the switches installed in the power inversion circuit shown in FIG. 11 may be other active semiconductor switches other than the MOSFETs M1, M2, M41 and M31 mentioned above.

Figure 13A:
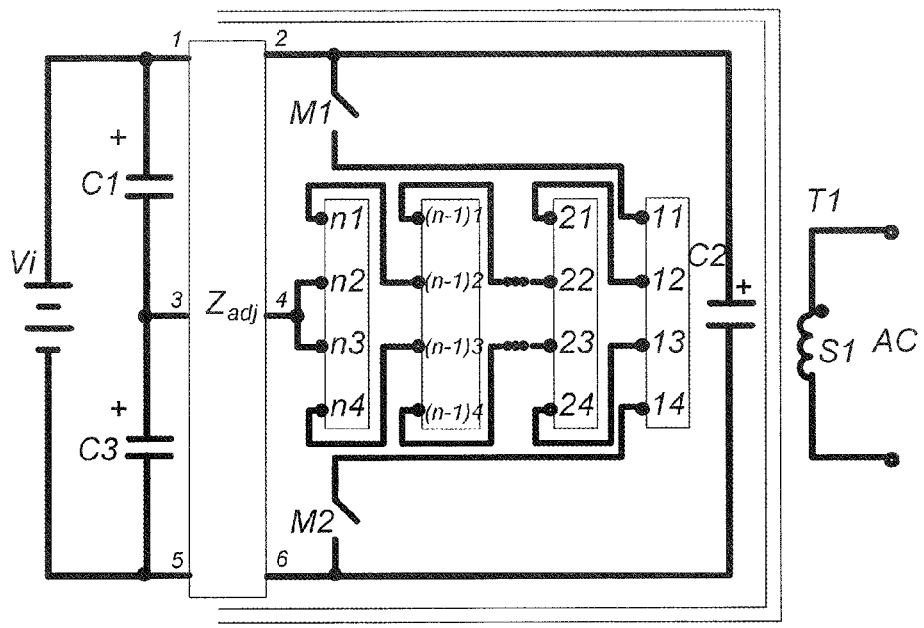
FIG. 13(a) to FIG. 13(e) is the circuit diagram of a single-transformer soft-switching DC-AC inversion circuits with its sub-circuits of nth middle-cell Cell-n applied thereto according to a second embodiment of the present invention.

Another family of single-transformer soft-switching low input current ripple inversion circuit as a second embodiment of the present invention is illustrated in FIG. 13(a). The primary side of the inversion circuit includes two series circuits, a first impedance adjusting unit Zadj, a clamp capacitor C2. The input DC voltage source Vi is converted to an output AC voltage via magnetically coupled to at least one secondary winding S1 of a transformer T1. The first series circuit is paralleled connected to the input DC voltage including a first input capacitor C1 and a third input capacitor C3 connected in series. The upper terminal of the first capacitor C1 and the lower terminal of the third capacitor C3 are respectively connected to the positive node and the negative node of the input voltage Vi. The second series circuit composed of a first semiconductor switch M1, at least one middle cell and a second semiconductor switch M2. The nth middle-cell has four terminals n1, n2, n3, and n4 includes a third semiconductor switch M3n, a fourth semiconductor switch M4n, and a fourth capacitor C4n as shown in FIG. 13 (b). The third semiconductor switch M3n is connected between terminals n1 and n2 of the nth middle-cell. The fourth semiconductor switch M4n is connected between terminals n3 and n4 of the nth middle-cell. The fourth capacitor C4n is connected between the terminal n1 and terminal n4 of the nth middle-cell.

The terminals 11, 14 of the first middle-cell are respectively connected to the lower node of the first semiconductor switch M1 and the upper node of the second semiconductor switch M2. Several middle-cells can be connected in series to reduce the voltage stress of the switches. Thus, the terminal 12, 13 of the first middle-cell are respectively connected to the terminals 21, 24 of the second middle-cell. Accordingly, the terminals (n−1)2 and (n−1)3 of the (n−1)th middle-cell are respectively connected to the terminals n1 and n4 of the nth middle-cell. However, the terminal n2 and n3 of the last middle-cell are connected together.

The upper node and the lower node of the clamp capacitor C2 are respectively connected to the upper node of the first semiconductor switch M1 and the lower node of the second semiconductor switch M2.

The Zadj has six terminals 1, 2, 3, 4, 5, and 6. Terminals 1, 2, 3, 4, 5, and 6 are respectively connected to the upper node of the C1, the upper node of the M1, the lower node of the C1 (the upper node of the C3), the terminal n2 (n3) of the last middle-cell, the lower node of the C3, and the lower node of the M2.

Figure 13B:
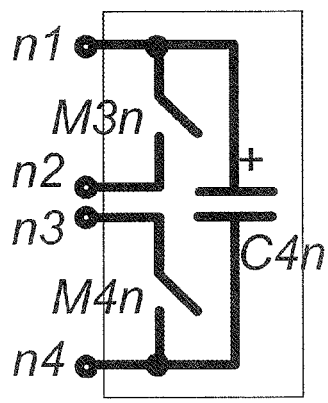

The switches shown in FIG. 13(a) and FIG. 13(b) with n middle-cells are divided into two sets; M1-M31-M32-...-M3n and M2-M41-M42-...-M4n. The switches in same set are turned on and turned off simultaneously. Employing the asymmetrical pulse-width-modulation (APWM) control or near 50% duty cycle variable frequency (VF) control schemes, two complementary sets of driver signals with a fixed dead-time interval are issued by a controller (not shown) to turn on or turn off the corresponding switch within one switching cycle. Consequently, ZVS operation can be achieved.

Figure 13C:
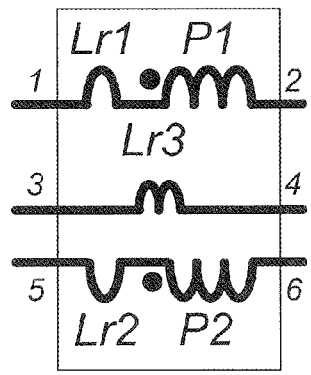
Figure 13D:
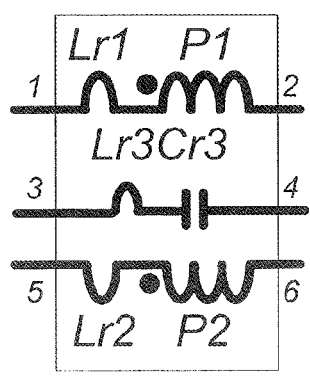
Figure 13E:
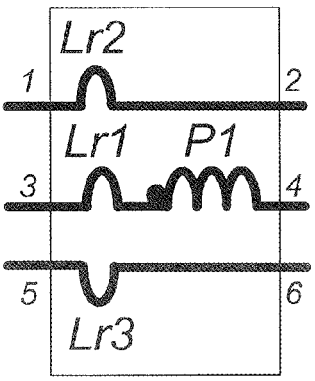
Figure 14A:
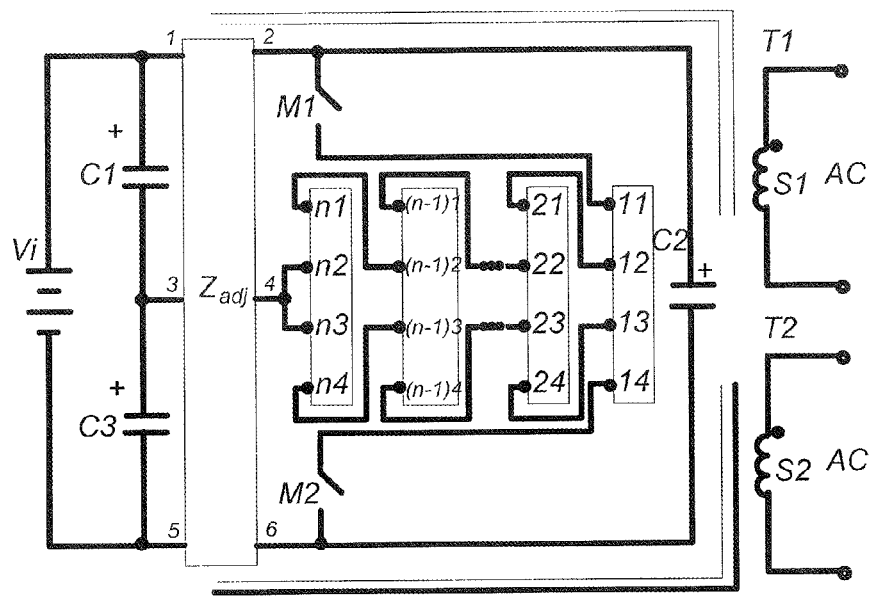
FIG. 14(a) to FIG. 14(e) is the circuit diagram of a two-transformer soft-switching DC-AC inversion circuits with its sub-circuits of nth middle-cell Cell-n applied thereto according to a second embodiment of the present invention.
Figure 14B:
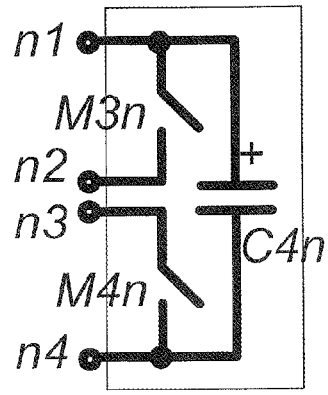
Figure 14C:
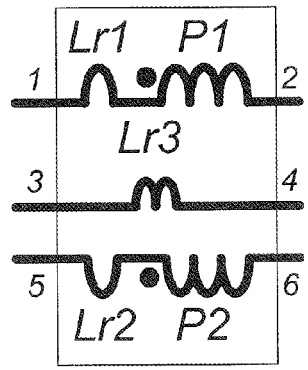
Figure 14D:
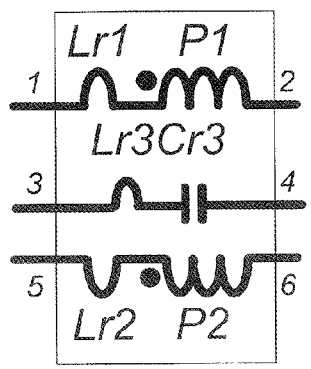
Figure 14E:
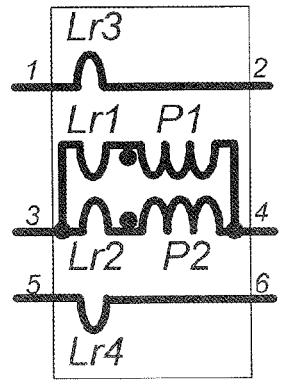

As shown in FIG. 13(c), FIG. 13(d), and FIG. 13(e) are three networks can be used to implement the Zadj, in which the P1 and P2 represent two identical primary windings of the transformer T1. The Lr1 and Lr2 represent the leakage inductance of the transformer primary windings P1 and P2. To achieve substantial ripple reduction and a wide ZVS operating range, two larger identical leakage inductances Lr1 and Lr2 are required. However, it is difficult to implement the required leakage inductance during transformer construction. Therefore, minimizing each leakage inductance with adding a common external large resonant inductor is a more practical solution as shown in FIG. 13(c) to FIG. 13(e).

Moreover, an external resonant capacitor Cr3 may also be needed as shown in FIG. 13(d). It can be used as a voltage source with the APWM (asymmetrical pulse-width-modulation) control scheme or it can be used as a resonant capacitor with near 50% duty cycle variable frequency control scheme.

By using the configuration of the Zadj as shown in FIG. 13(c), FIG. 13(a) is a first member of the single-transformer soft-switching low input current ripple inversion circuit of the present invention. As shown, the Lr1 and P1 are series-connected between the terminals 1 and 2 of the Zadj. The third inductor Lr3 is connected between the terminals 3 and 4 of the Zadj. The Lr2 and P2 are series-connected between the terminals 5 and 6 of the Zadj.

By using the configuration of the Zadj as shown in FIG. 13(d), FIG. 13(a) is a second member of the single-transformer soft-switching low input current ripple inversion circuit of the present invention. As shown, the Lr1 and P1 are series-connected between the terminals 1 and 2 of the Zadj. The third inductor Lr3 and the fifth capacitor Cr3 is connected in series between the terminals 3 and 4 of the Zadj. The Lr2 and P2 are series-connected between the terminals 5 and 6 of the Zadj.

By using the configuration of the Zadj as shown in FIG. 13(*e*), FIG. 13(*a*) is a third member of the single-transformer soft-switching low input current ripple inversion circuit of the present invention. As shown, the third inductor Lr2 is connected between the terminals 1 and 2 of the Zadj. The Lr1 and P1 are series-connected between the terminals 3 and 4 of the Zadj. The Lr3 is connected between the terminals 5 and 6 of the Zadj. The Lr2 and the Lr3 can be implemented with two separate inductors or a two-winding coupling inductor.

Therefore, the voltage stress on the MOSFETs can be reduced to 1/(n+1) input voltage in which n is the number of the middle-cell inserted.

To increase the output power, moreover, the single transformer T1 can be replaced with two transformers T1 and T2. The inductor Lr1 (Lr2) represents the leakage inductance of primary winding P1 (P2) or one separate inductor. Each transformer has one primary winding and at least one secondary being electrically connected in parallel or series to produce the AC output as shown in FIG. 14(*a*).

If a DC output voltage is required to a load, additional rectified and filtered stages (not shown) are needed.

Because both circuits in FIG. 13(*a*) and FIG. 14(*a*) share the same operating characteristics, consequently, the second embodiment of the present invention will be disclosed by using a single transformer DC-AC inversion circuit only.

Figure 15:
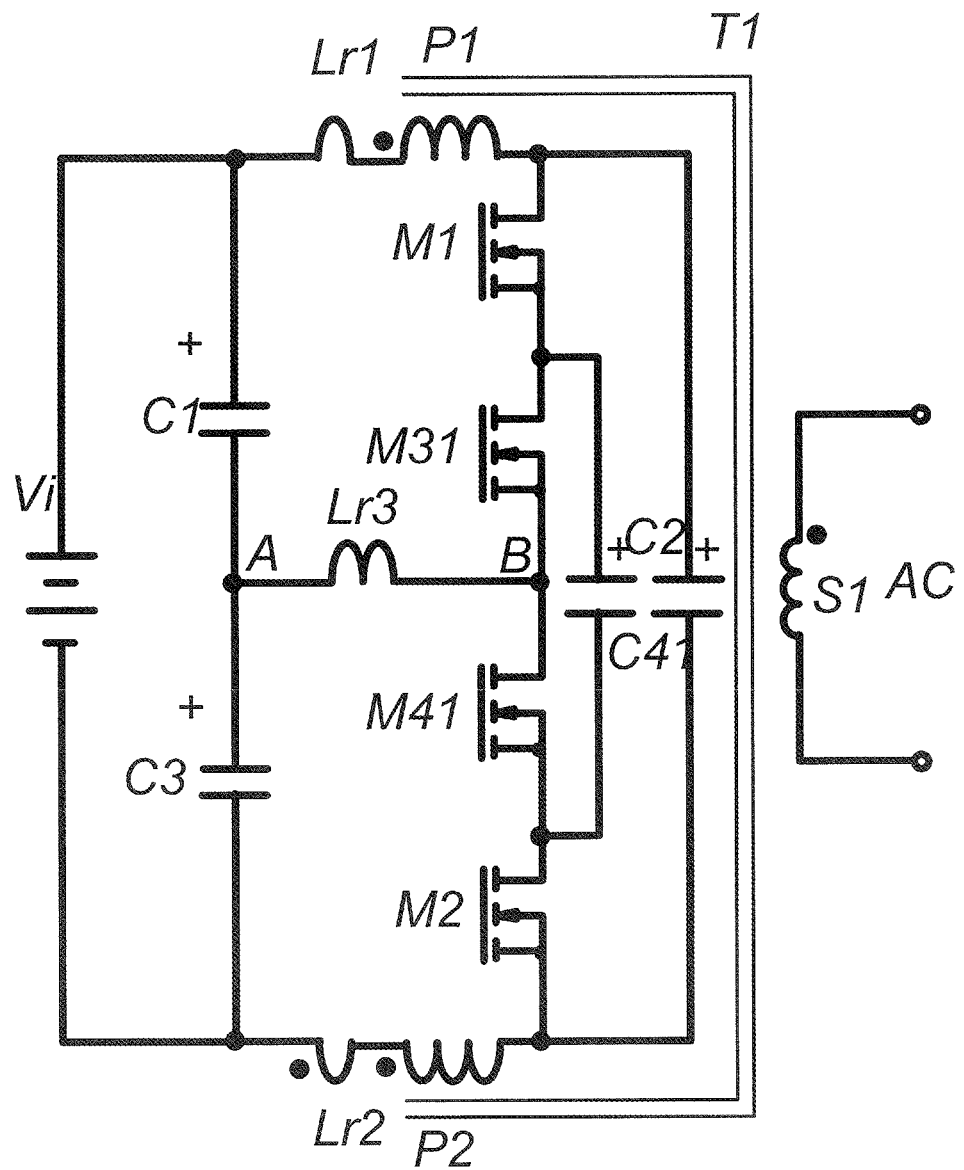
FIG. 15 is an example circuit diagram of the DC-AC inversion circuit shown in FIG. 13(a) wherein the circuit is realized with Zadj (FIG. 13(c)) and one middle-cell (FIG. 13(b))
Figure 16A:
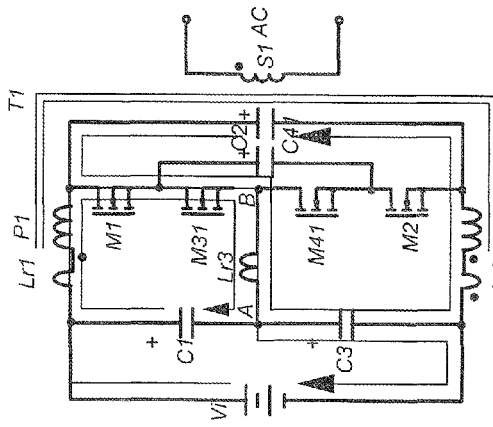
FIG. 16(a) to FIG. 16(d) shows the equivalent circuit of the DC-AC inversion circuit shown in FIG. 15 when the switches are turned on and turned off, respectively.
Figure 16B:
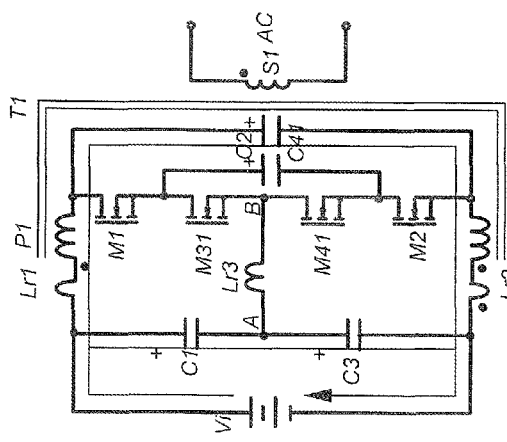
Figure 16C:
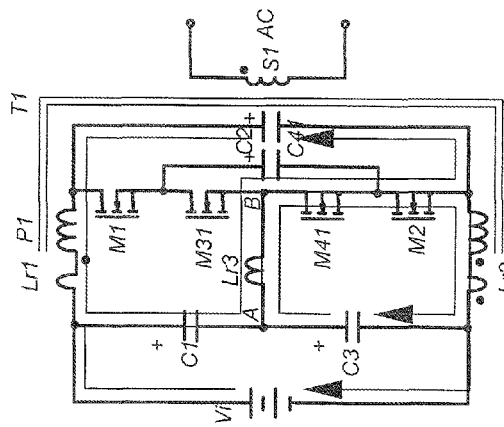
Figure 16D:
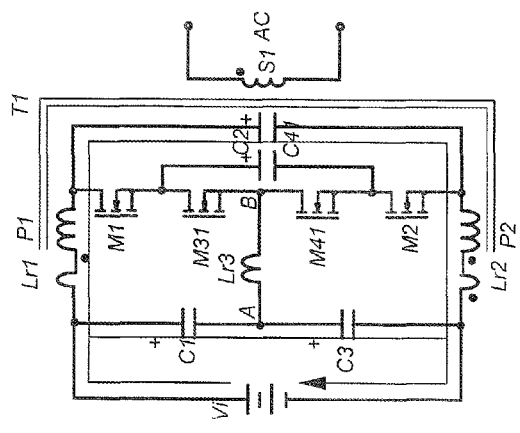

In accordance with the present invention, power inversion circuit of an application example of the second embodiment and its operating stages are illustrated as shown in FIG. 15 and FIG. 16, respectively. Two series circuits are parallel-connected with the DC input. The first series circuit includes two input capacitors C1 and C3. The second series circuit includes primary P1 of transformer T1, a first switch M1, a third switch M31, a fourth switch M41, a second switch M2, and primary P2 of transformer T1 connected in series sequentially. The center node of the first series circuit (C1-C3) and the center-node of the second series circuit (M31-M41) are coupled by a third inductor Lr3. The fourth capacitor C41 is connected between the upper node of the third semiconductor switch M31 and the lower node of the fourth semiconductor switch M41. The transformer T1 includes two identical primary windings P1 and P2 and at least one secondary winding S1. The first inductor Lr1 and the second inductor Lr2 represent the respective leakage inductance of the primary windings P1 and P2.

It has an advantage to obtain lower equivalent $R_{DS(on)}$ with two low-voltage rating MOSFETs connected in series. Consequently, the conduction losses can be reduced and the converter efficiency can be improved.

Assumed that the clamping capacitors C1 and C3 are identical, the voltages across the clamping capacitors C1 and C3 are equal to one-half DC input voltage Vi. Thus, as shown in FIG. 16(*a*) to FIG. 16(*d*), there are four operation stages within one switching cycle during steady-state operation.

As shown in FIG. 16(*a*), gate drive signals (not shown) are issued to turn on the MOSFETs M1 and M31 during the first time interval. Three one-half input voltages are provided to the P1, P2, and Lr3 via the following routes labeled by the marks of the elements thereof sequentially:
(1) Vi(+)-Lr1-P1-M1-M31-Lr3-C3-Vi(−);
(2) C1(+)-Lr1-P1-M1-M31-Lr3-C1(−); and
(3) C2(+)-M1-M31-Lr3-C3-Lr2-P2-C2(−), in which the clamping capacitor C1 and clamping capacitor C2 are discharged while the capacitor C3 is charged during the first time interval.

As shown in FIG. 16(*b*), the gate drive signals (not shown) are issued to turn off the MOSFETs M1 and M31 during a second time interval (a fixed dead-time interval). The clamping capacitors C2 is charged by the input voltage Vi and the energies stored in the leakage inductances of the transformer T1. Due to the volt-second balance applied to both the first and second primary windings P1 and P2, the average voltage across the clamping capacitor C2 is equal to the input voltage Vi. Because the capacitor $C_{41}$ is clamped to one-half input voltage and the leakage energies are absorbed resulting in having maximum one-half input voltage with spike-free voltage waveform on the MOSFETs M1 and M31.

As shown in FIG. 16(*c*), the gate drive signals (not shown) are issued to turn on the MOSFETS M2 and M41 during a third time interval. Three one-half of input voltages are provided to the P1, P2, Lr3, and Cr via the following routes labeled by the marks of the elements thereof sequentially:
(1) Vi(+)-C1-Lr3-M41-M2-P2-Lr2-Vin(−);
(2) C3(+)-Lr3-M41-M2-P2-Lr2-C3(−); and
(3) C2(+)-P1-Lr1-C1-Lr3-M41-M2-C2(−), in which the clamping capacitors C2 and C3 are discharged while the capacitor C1 is charged during the third time interval.

As shown in FIG. 16(*d*), the gate drive signals (not shown) are issued to turn off the second MOSFETS M2 and M41. The clamping capacitors C2 is charged by the input voltage Vi and the energies stored in the leakage inductances of the transformer T1. Due to the volt-second balance applied to both the first and second primary windings P1 and P2, the average voltage across the clamping capacitors C2 is equal to the input voltage Vi. Because the capacitor $C_{41}$ is clamped to one-half input voltage and the leakage energies are absorbed resulting in having maximum one-half input voltage with spike-free voltage waveform on the MOSFETs M2 and M41.

As an enhancement of the embodiment, the switches installed in the power inversion circuit shown in FIG. 15 may be other active semiconductor switches other than the MOSFETs M1, M41, M31 and M2 mentioned above.

Moreover, the desired low current-ripple, low voltage stress and soft-switching operation on semiconductor switches performance of the inversion circuit can be extended to the rectifier circuit and will be described below.

Figure 17:
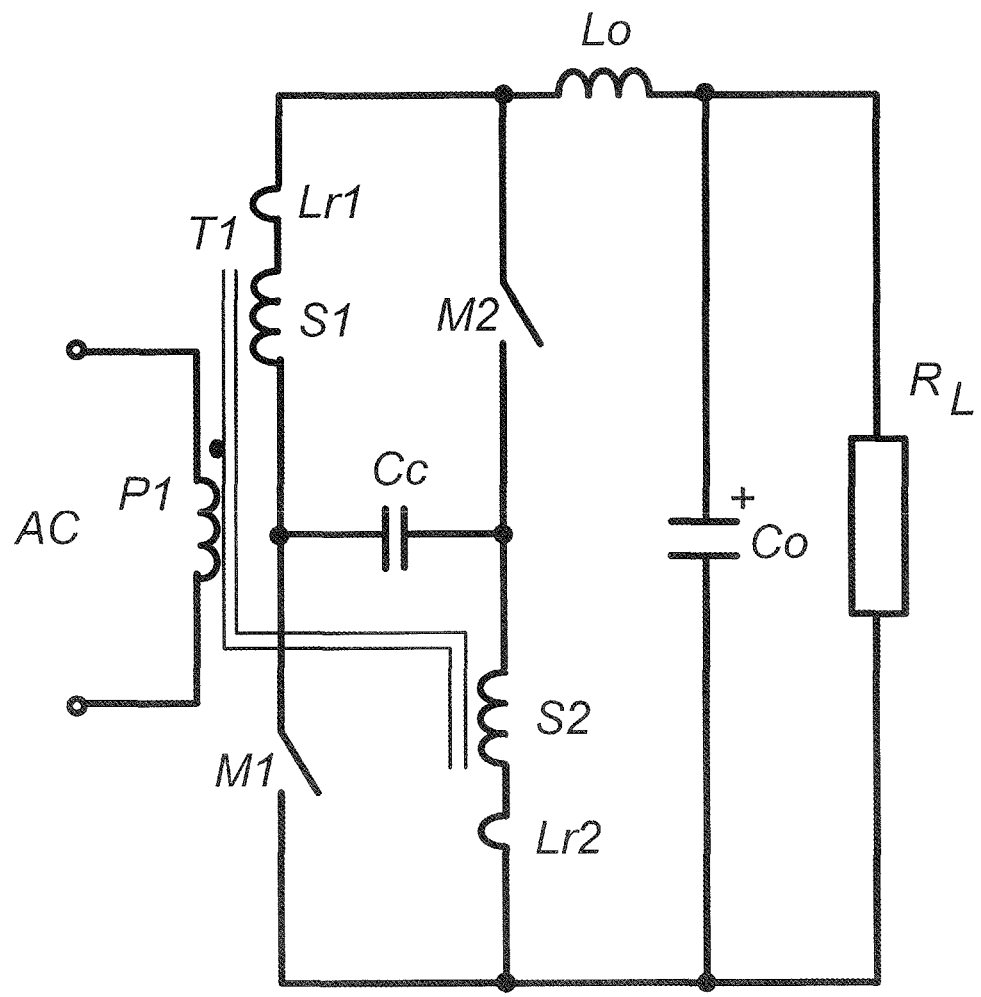
FIG. 17 is the circuit diagram of a single-transformer soft-switching AC-DC rectification circuit according to a third embodiment of the present invention.

A family of single-transformer soft-switching low output current-ripple rectification circuit as a third embodiment in accordance with the present invention is illustrated in FIG. 17. It is used to convert AC voltage received at a primary winding P1 of a transformer T1 to a DC output voltage. The secondary side of the transformer includes three series-connected circuits formed by one transformer T1, two switches (as the rectifiers) M1 and M2, one output inductor Lo, one output capacitor Co and one clamping capacitor Cc. The transformer T1 has at least one primary winding P1 and at least one pair of secondary windings S1 and S2 having identical turns.

All three series circuits are connected in parallel. The first series circuit includes the first secondary winding S1 and the first switch M1. The second series circuit includes the second switch M2 and the second secondary winding S2. The third series circuit includes the output inductor Lo and output capacitor Co. Across the output capacitor within the third series circuit, a DC output voltage Vo is produced to provide a load $R_L$.

Lr1 or Lr2 represents the leakage inductance with or without a series external inductor of the transformer secondary windings S1 and S2, respectively.

The two terminals of the clamping capacitor Cc are connected between the center nodes of the first series circuit and the second series circuit.

At least one transformer primary provides said AC voltage and magnetically coupled to transformer secondary windings.

Operationally, the DC output voltage, $V_o$, is charged by the clamping capacitor $C_c$ via the two transformer secondary windings (S1 and S2) and the average voltage across Cc is thus clamped to the output voltage.

Figure 18:
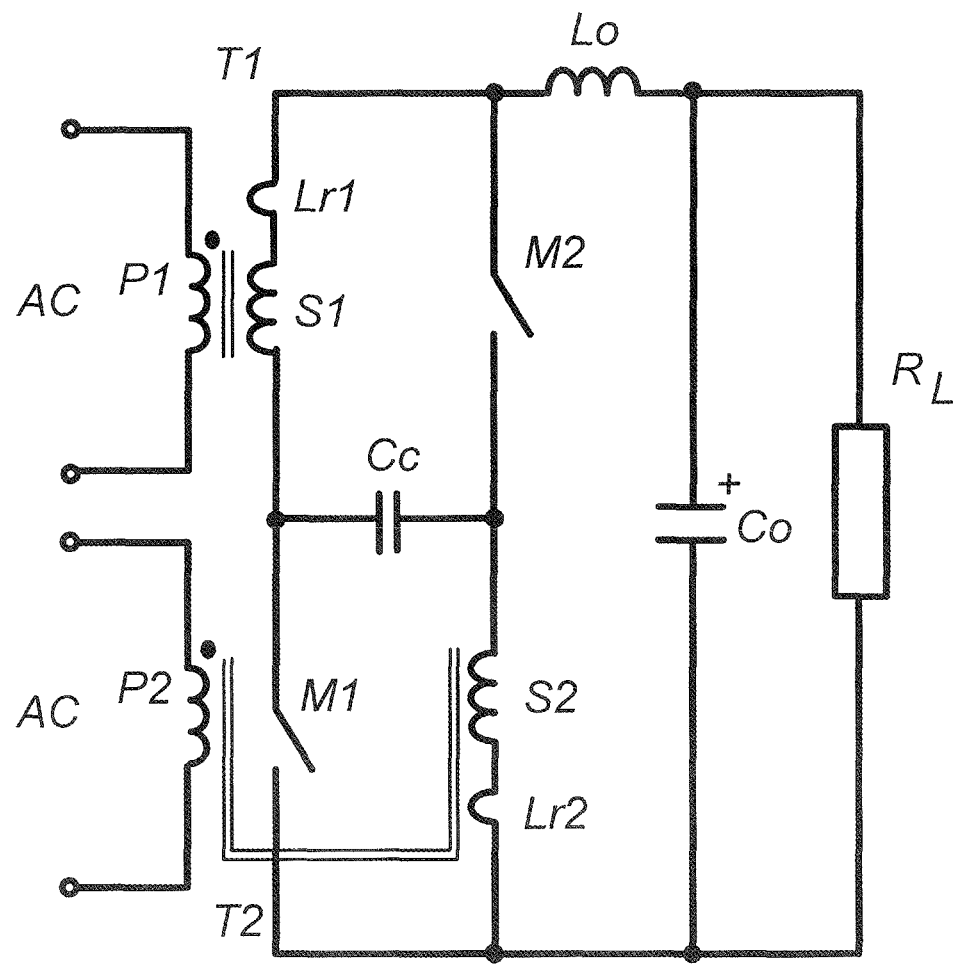
FIG. 18 is the circuit diagram of a two-transformer soft-switching AC-DC rectification circuit according to a third embodiment of the present invention.

Another member of the third embodiment according to the present invention is shown in FIG. 18. Two transformers T1 and T2 are used to replace the single transformer T1. Primary P1 of transformer T1 and primary P2 of transformer T2 correspond to primary P1 and primary P2 of FIG. 17. Each transformer has at least one primary winding being electrically connected in parallel or series to provide the AC input voltage. The circuit of FIG. 18 has an advantage to achieve high output power capability with two transformers instead of employing interleaved technique with two power converters.

Because both circuits in FIG. 17 and FIG. 18 share the same operating characteristics, consequently, the third embodiment of the present invention will be disclosed by using a single transformer AC-DC rectification circuit only.

Figure 19:
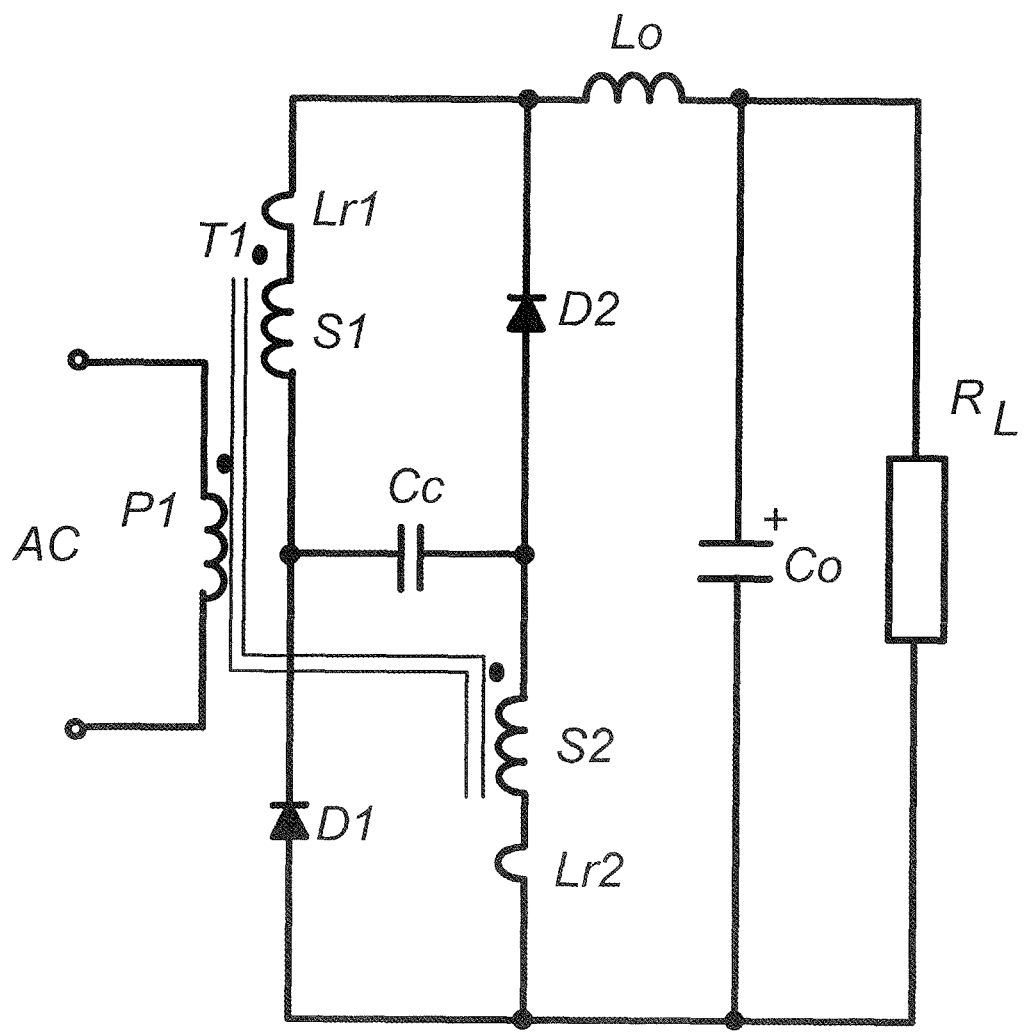
FIG. 19 is an example circuit diagram of the AC-DC rectification circuit shown in FIG. 17 wherein the switches (M1, M2) are realized with rectifier diodes (D1, D2)

In accordance with the present invention, power rectification circuit of an application example of the third embodiment and its operating stages are illustrated as shown in FIG. 19 and FIG. 20, respectively. Rectifier diodes D1-D2 shown in FIG. 19 are used to be the switches M1-M2 shown in FIG. 17. The non-dot node of the secondary wingding S1 and the dot node of the secondary winding S2 are coupled by the capacitor Cc.

Figure 20A:
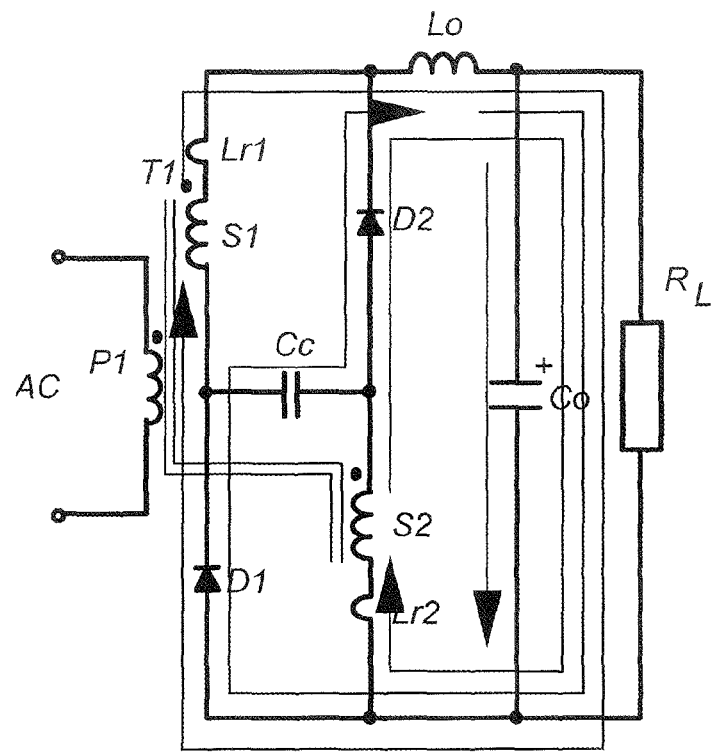
FIG. 20(a) and FIG. 20(b) show the equivalent circuit of the AC-DC rectification circuit shown in FIG. 19 when the diodes are turned on and turned off, respectively.

Referring to FIG. 20(a), the AC voltage of the primary winding P1 is coupled to the first secondary winding S1 and the second secondary winding S2. The first rectifier diode D1 and the second rectifier diode D2 are forward biased to be turned on during the first time interval. In addition to the output filter capacitor Co, the load currents are provided via S1(dot)-Lr1-Lo-RL-D1-S1(non-dot) and S2 (dot)-D2-Lo-RL-Lr2-S2(non-dot), while the capacitor Cc is charged via Lo-RL-D1-Cc-D2-Lo.

Figure 20B:
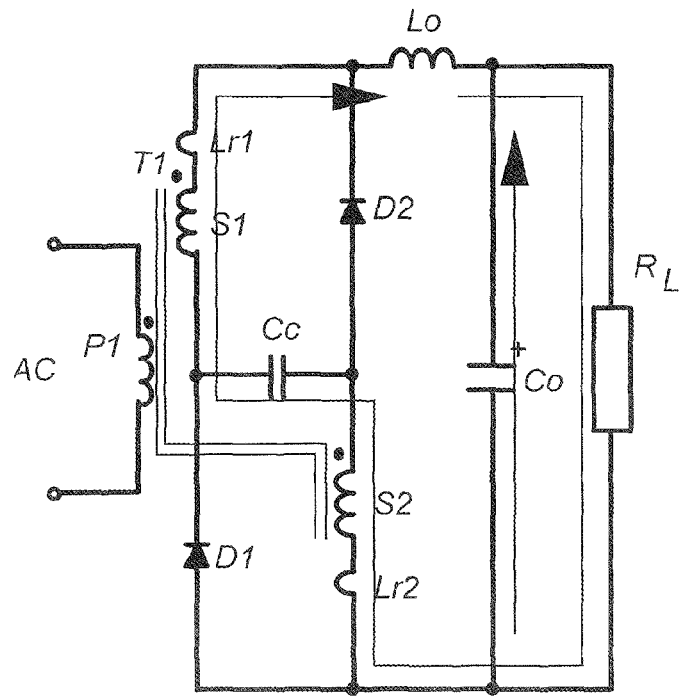

During the second time interval, the first secondary winding S1 and the second secondary winding S2 applied with the reverse voltage. Consequently, the first rectifying diode D1 and the second rectifying diode D2 are thus turned off as shown in FIG. 20(b). The energies stored in the capacitor Cc and the transformer leakage inductance provide output current to the load RL via Cc(+)-S1-Lr1-Lo-RL-Lr2-S2-Cc(−). Because of the load currents provided by the clamp capacitor Cc, the first rectifier diode D1 and the second rectifier diode D2 are operated at zero current. The leakage inductance energy of the transformer T1 is absorbed, therefore, the voltage waveforms of the first and second rectifier diodes D1, D2 are spike-free. Due to help of the clamp capacitor Cc, moreover, the current ripple of the output filter capacitor Co will be greatly reduced resulting in minimizing the required output capacitance.

Figure 21:
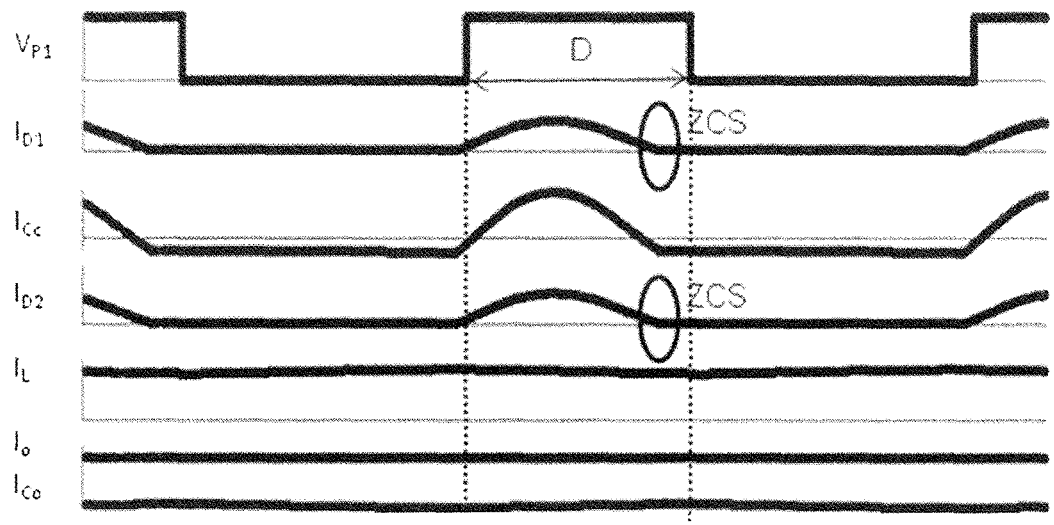
FIG. 21 shows several key waveforms of the circuit shown in FIG. 19.

Several key waveforms obtained by computer simulation program SIMPLIS is shown in FIG. 21. It includes the voltage waveform VP1 of the first primary winding P1 of the transformer, the current waveforms of the rectifier diodes D1, D2, the capacitor Cc, the output filter inductor Lo and the output filter capacitor Co. It shows that the rectifier diodes D1 and D2 are operated with zero current operation and the output capacitor Co has low current ripple.

Figure 22:
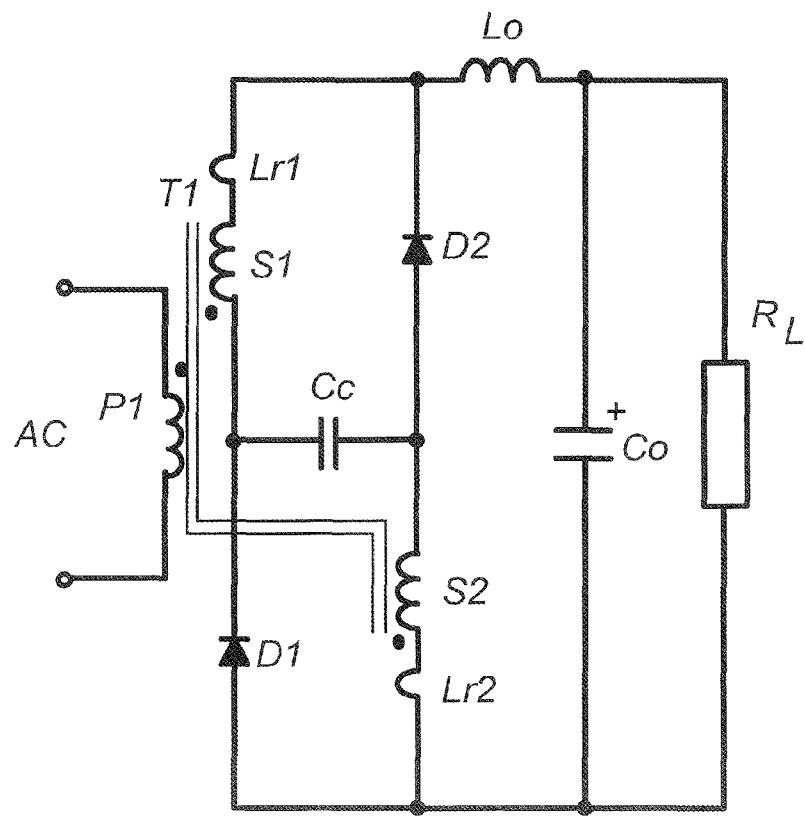
FIG. 22 is another example circuit diagram of the AC-DC rectification circuit shown in FIG. 17 wherein the secondary windings S1 and S2 are connected with different polarity from that in FIG. 19.

In accordance with the present invention, power rectification circuit of another application example of the third embodiment and its operating stages are illustrated as shown in FIG. 22 and FIG. 23, respectively. Rectifier diodes D1-D2 shown in FIG. 22 are used to be the switches M1-M2 shown in FIG. 17. The dot node of the secondary wingding S1 and the non-dot node of the secondary winding S2 are coupled by the capacitor Cc.

Figure 23A:
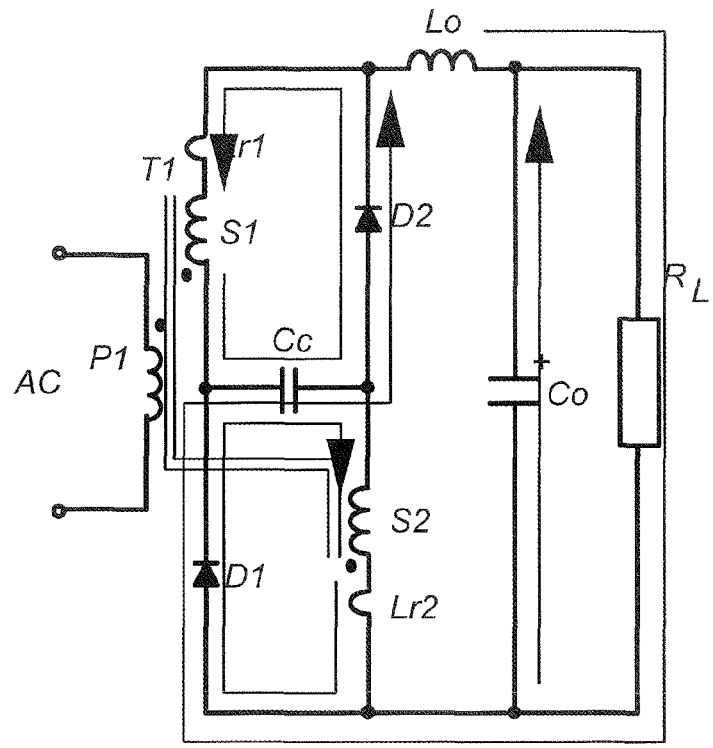
FIG. 23(a) and FIG. 23(b) show the equivalent circuit of the AC-DC rectification circuit shown in FIG. 22 when the diodes are turned on and turned off, respectively.

Referring to FIG. 23(a), the AC voltage of the primary winding P1 is coupled to the first secondary winding S1 and the second secondary winding S2. The first rectifier diode D1 and the second rectifier diode D2 are forward biased to be turned on during the first time interval. The capacitor Cc is charged via S1(dot)-Cc-D2-Lr1-S1(non-dot) and S2(dot)-D1-Cc-S2(non-dot)-Lr2. In addition to the output filter capacitor Co, the load current is provided via Lo-RL-D1-Cc-D2-Lo.

Figure 23B:
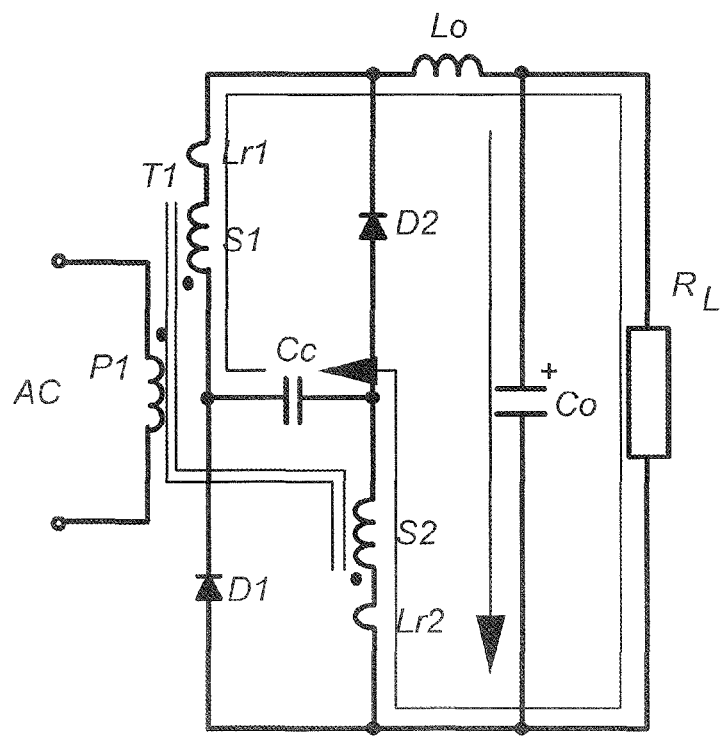

During the second time interval, the first secondary winding S1 and the second secondary winding S2 applied with the reverse voltage. Consequently, the first rectifying diode D1 and the second rectifying diode D2 are thus turned off as shown in FIG. 23(b). The energies stored in the capacitor Cc and the transformer leakage inductance provide output current to the load. RL via. Cc(+)-S1-Lr1-Lo-RL-Lr2-S2-Cc(−). Because of the load currents provided by the clamp capacitor Cc, the first rectifier diode D1 and the second rectifier diode D2 are operated at zero current. The leakage inductance energy of the transformer T1 is absorbed, therefore, the voltage waveforms of the first and second rectifier diodes D1, D2 are spike-free. Due to help from the clamp capacitor Cc, moreover, the current ripple of the output filter capacitor Co will be greatly reduced resulting in minimizing the required output capacitance.

Figure 24:
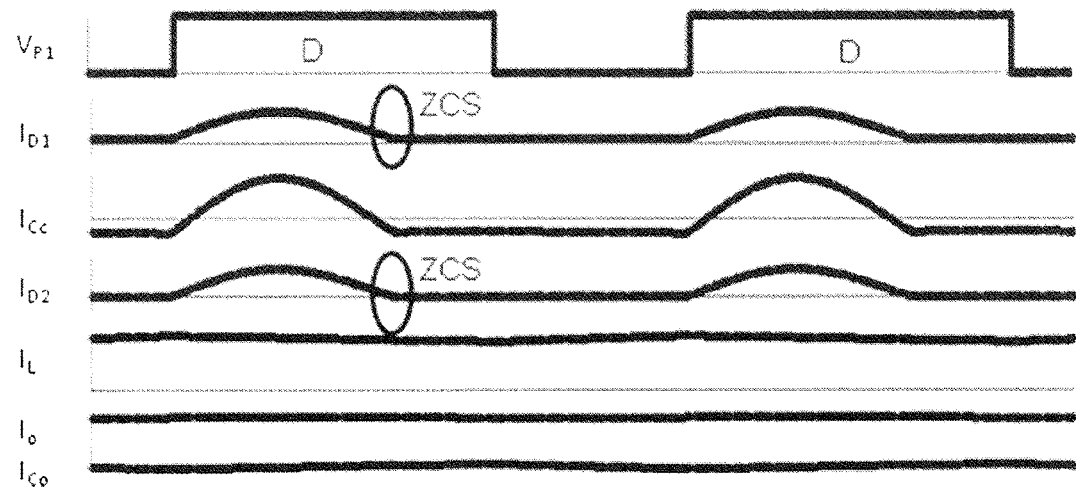
FIG. 24 shows several key waveforms of the circuit shown in FIG. 22.

Several key waveforms obtained by computer simulation program SIMPLIS is shown in FIG. 24. It includes the voltage waveform VP1 of the first primary winding P1 of the transformer, the current waveforms of the rectifier diodes D1, D2, the capacitor Cc, the output filter inductor Lo and the output filter capacitor Co. It shows that the rectifier diodes D1 and D2 are operated with zero current operation and the output capacitor Co has low current ripple.

Figure 25:
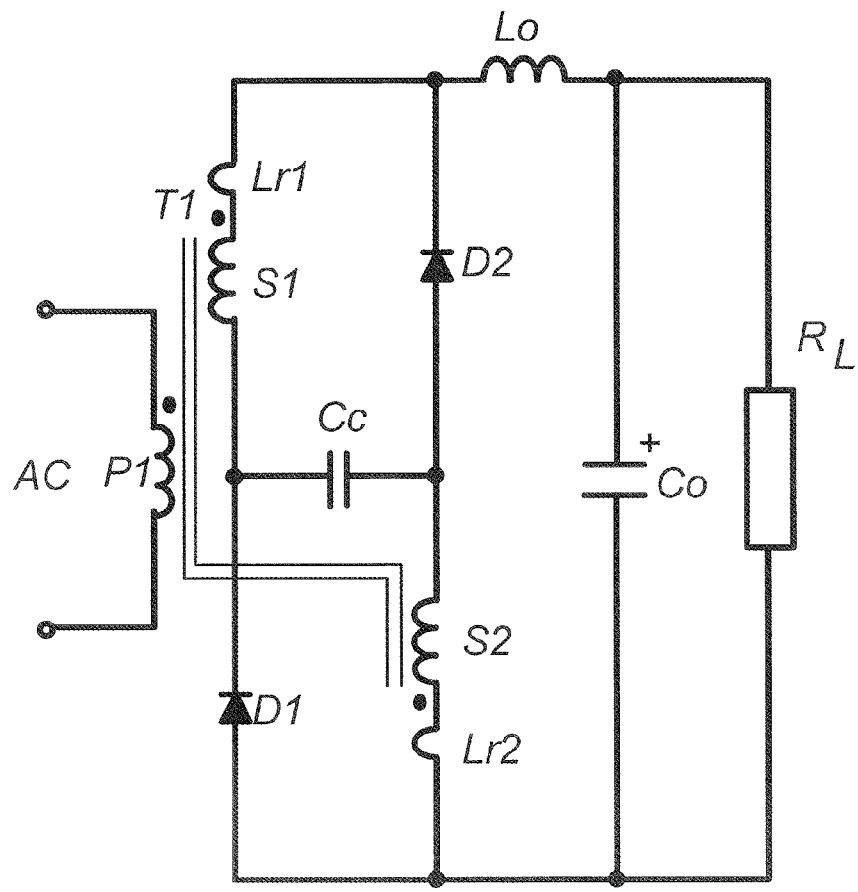
FIG. 25 is another example circuit diagram of the AC-DC rectification circuit shown in FIG. 17 wherein the secondary windings S2 is connected with different polarity from that in FIG. 19.

In accordance with the present invention, power rectification circuit of an application example of the third embodiment and its operating stages are illustrated as shown in FIG. 25 and FIG. 26, respectively. Rectifier diodes D1-D2 shown in FIG. 25 are used to be the switches M1-M2 shown in FIG. 17. The non-dot node of the secondary wingding S1 and the non-dot node of the secondary winding S2 are coupled by the capacitor Cc.

Thus, as shown in FIG. 26(a) to FIG. 26(d), the diodes D1 and D2 are biased to be turned on and turned off alternatively. There are four operation stages within one switching cycle during steady-state operation.

Figure 26A:
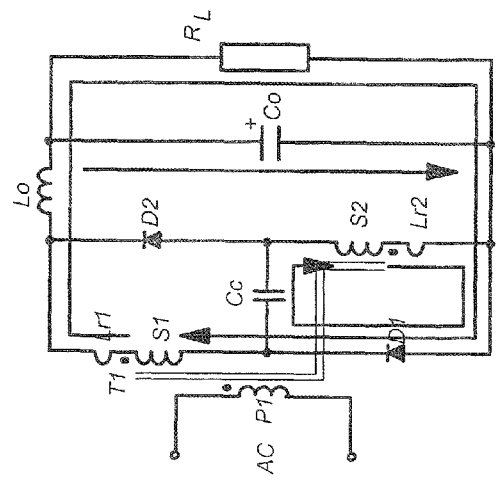
FIG. 26(a) and FIG. 26(d) show the equivalent circuit of the AC-DC rectification circuit shown in FIG. 25 when the diodes are turned on and turned off, respectively.

As shown in FIG. 26(a), the first diode D1 is turned on due to its forward-biased operating condition provided by the voltage of the first secondary winding S1 in this time interval. The first secondary winding S1 couples the input AC voltage to charge the output capacitor Co and the load R sequentially via the S1(dot)-Lr1-Lo-$R_L$-D1-S1(non-dot). At the same time, the clamping capacitor Cc is charged by the second secondary winding S2 via the S2(dot)-Lr2-D1-Cc-S2(non-dot). The output capacitor Co and clamping capacitor Cc are charged during this time interval.

Figure 26B:
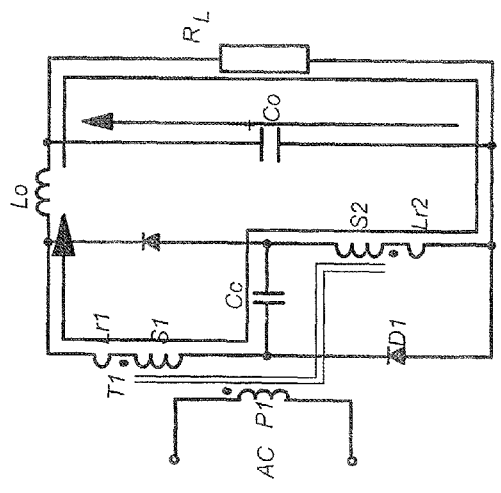

As shown in FIG. 26(b), D1 is turned off due to its reverse-biased operating condition provided by the voltage of the first secondary winding S1 in this time interval. The output current are provided by the energies stored in the leakage inductances (Lr1 and Lr2) and the clamping capacitor Cc via. Cc(+)-S1-Lr1-Lo-RL-Lr2-S2-Cc(−). Due to the current commutation between the clamping capacitor Cc and D1, the zero-current operation of the D1 can be achieved. The average voltage across the clamping capacitor Cc is equal to output voltage because of the volt-second balance applied to the S1, S2, and Lo. Since leakage energy is absorbed, therefore, the voltage waveform of the first diode D1 has no voltage spike. Moreover, due to the help of the clamping capacitor Cc, the output filter capacitor current ripple is reduced resulting in minimizing the required output capacitor Co.

Figure 26C:
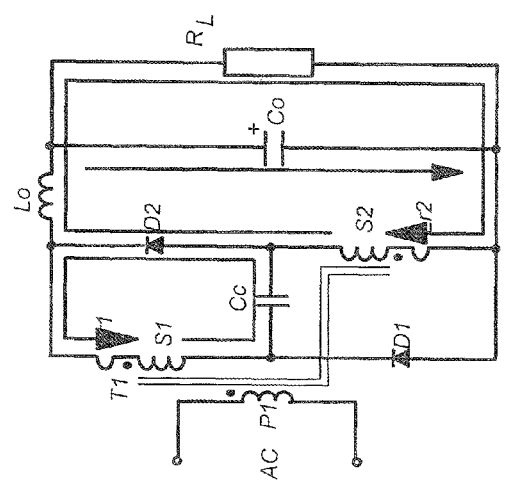

As shown in FIG. 26(c), the second diode D2 is turned on due to its forward-biased operating condition provided by the voltage of the second secondary winding S2 in this time interval. The second secondary winding S2 couples the input AC voltage to charge the output capacitor Co and the load $R_L$ sequentially via the S2(non-dot)-D2-Lo-$R_L$-Lr2-S2(dot). At the same time, the clamping capacitor Cc is charged by the first secondary winding S1 via the S1(non-dot)-Cc-D2-Lr2-S1(dot). The output capacitor Co and clamping capacitor Cc are charged during this time interval.

Figure 26D:
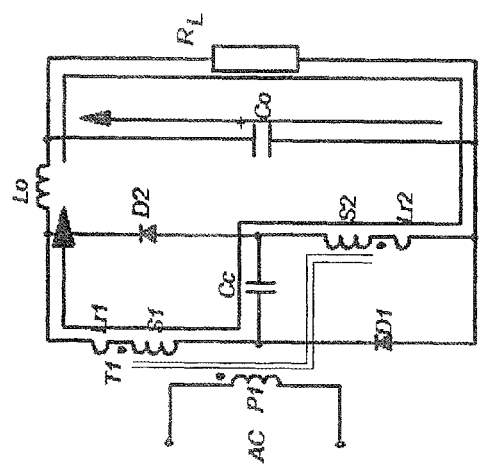

As shown in FIG. 26(d), D2 is turned off due to its reverse-biased operating condition provided by the voltage of the second secondary winding S2 in this time interval. The output current are provided by the energies stored in the leakage inductances (Lr1 and Lr2) and the clamping capacitor Cc via Cc(+)-S1-Lr1-Lo-RL-Lr2-S2-Cc(−). Due to the current commutation between the clamping capacitor Cc and D2, the zero-current operation of the D2 can be achieved. The average voltage across the clamping capacitor Cc is equal to output voltage because of the volt-second balance applied to the S1, S2, and Lo. Since leakage energy is absorbed, therefore, the voltage waveform of the second diode D2 has no voltage spike. Moreover, due to the help of the clamping capacitor Cc, the output filter capacitor current ripple is reduced resulting in minimizing the required output capacitor Co.

Figure 27:
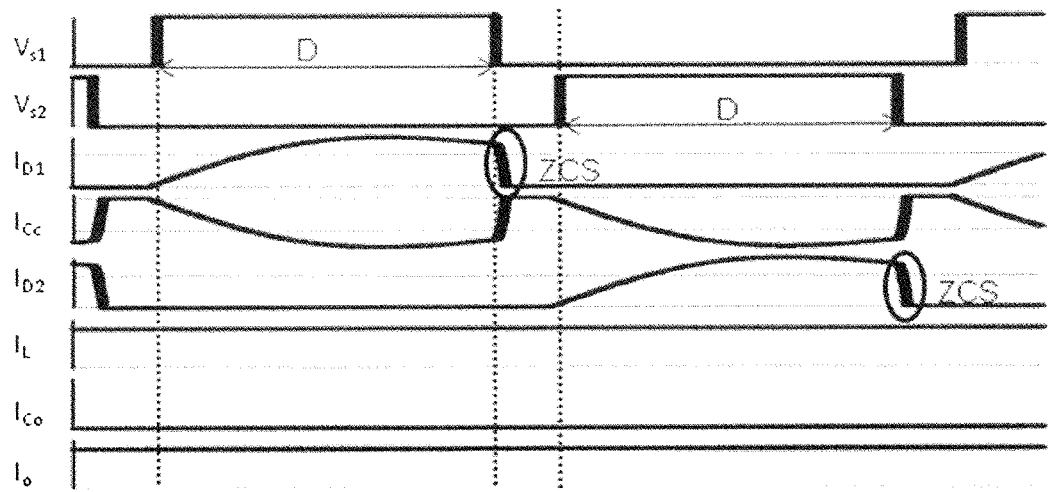
FIG. 27 shows several key waveforms of the circuit shown in FIG. 25.

Employing near 50% duty cycle control scheme to the circuit as shown in FIG. 25, several key waveforms of the power rectification circuit of the third present invention are shown in FIG. 27. As shown, most of the output currents are provided by the inductor resulting in having small output filter capacitor current ripple $I_{Co}$. In addition, the $I_{D1}$ and $I_{D2}$ are commutated with the current through the clamping capacitor $I_{Cc}$ during D1 or D2 turn-off time interval. Consequently, both diodes are turned off with ZCS operating condition.

In the foregoing embodiments, the rectifier diodes are used as rectifiers. However, as an enhancement of the embodiment to improve the efficiency, the rectifiers may be, for example, synchronous rectifiers or a combination of one diode and one synchronous rectifier.

Figure 28:
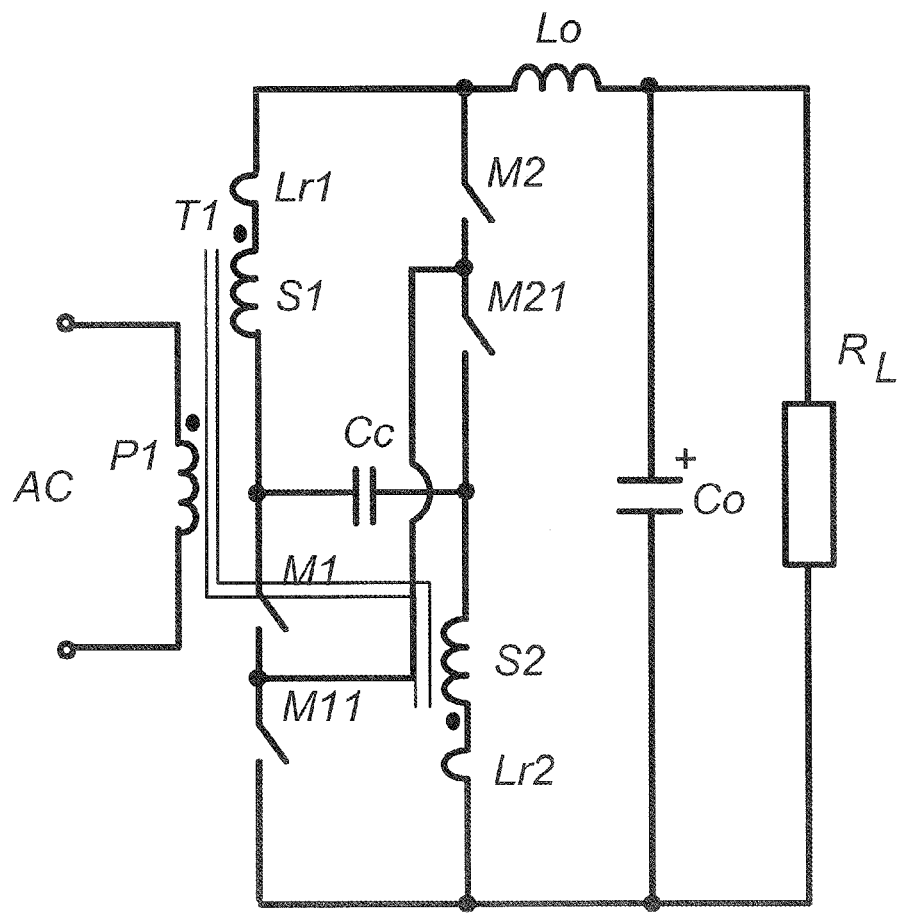
FIG. 28 is the circuit diagram of a single-transformer soft-switching AC-DC rectification circuit modified with two series-connected-switch pairs from FIG. 17 according to a fourth embodiment of the present invention.

A family of single-transformer soft-switching low output current-ripple rectification circuit as a fourth embodiment according to the present invention is shown in FIG. 28. Two switch pairs, M1-M11 and M2-M21 are used to replace the switches M1 and M2 (as shown in FIG. 17), respectively. To assure the voltage sharing among the switches, the center nodes between the first switch-pair M1-M11 and the second switch-pair M2-M21 are connected together. It has an advantage to achieve lower forward voltage with two low-voltage rating diodes connected in series. Consequently, lower voltage rating MOSFET can be used resulting in reducing the conduction losses and improving the converter efficiency. The circuit of FIG. 28 has the advantages to be suitable for the high output voltage applications.

Figure 29:
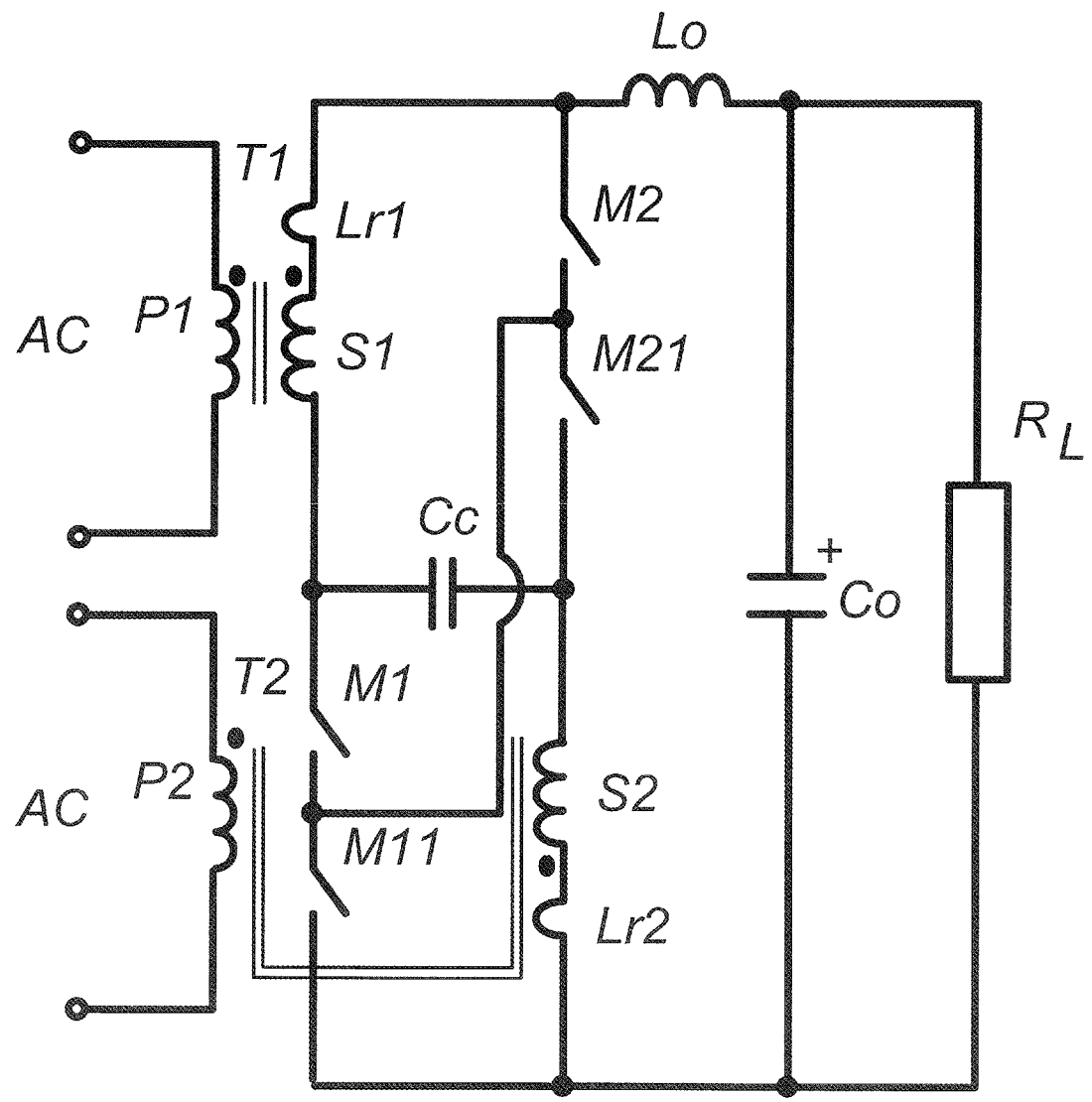
FIG. 29 is the circuit diagrams of a two-transformer soft-switching AC-DC rectification circuit modified with two series-connected-switch pairs from FIG. 18 according to a fourth embodiment of the present invention.

Another member of the fourth embodiment according to the present invention is shown in FIG. 29. Two transformers T1 and T2 are used to replace the single transformer T1. Primary P1 of transformer T1 and primary P2 of transformer T2 correspond to primary P1 and primary P2 of FIG. 28. Each transformer has at least one primary winding being electrically connected in parallel or series to provide the AC output voltage. The circuit of FIG. 29 has an advantage to achieve high output power capability with two transformers instead of employing interleaved technique with two power converters.

The rectification circuits as shown in FIG. 17, FIG. 18, FIG. 28, and FIG. 29 have different number of transformers and switches for different the output voltage and/or output power applications. However, same operating characteristics can be shared each other. Moreover, switches M1, M11, M2, and M21 are not limited to diodes. Other types of active semiconductor switches (eg: MOSFET) can be used to provide synchronous rectification to improve rectification efficiency.

Figure 30A:
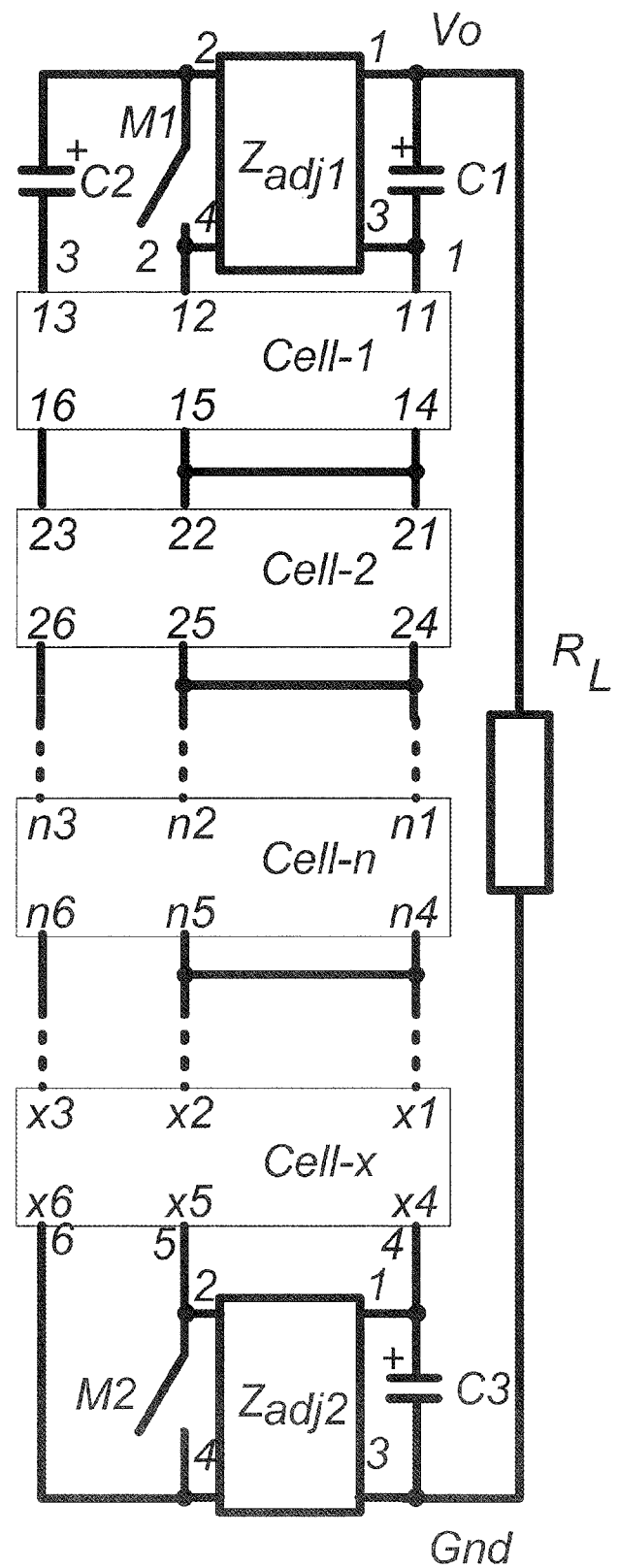
FIG. 30(a) to FIG. 30(d) is the circuit diagram of the pick-up antenna rectification circuits with their sub-circuits of nth middle-cell Cell-n applied thereto according to a fifth embodiment of the present invention.

A family of the rectification circuit as a fifth embodiment in accordance with the present invention is illustrated in FIG. 30(a). Instead of using a magnetic transformer T1, a device such as pick-up antenna can be used as a receiver to have AC voltage. Consequently, this AC voltage is converted to a DC output voltage across the load RL. It includes one top-cell (having four terminals labeled as Vo, 1, 2, and 3), several middle-cells (in which nth middle-cell is labeled as Cell-n and has six terminals n1, n2, n3, n4, n5, and n6) and one bottom-cell (having four terminals labeled as GND, 4, 5, and 6) series-connected sequentially.

As shown, the top-cell includes two clamping capacitors (C1 and C2), the first impedance adjusting unit Zadj1 and the first semiconductor switch M1, in which Zadj1 has four terminals 1, 2, 3, and 4. The terminal 1 of the Zadj1 is connected to the upper node of the capacitor C1. The terminal 2 of the Zadj1, the upper nodes of the M1 and the clamp capacitor C2 are connected together. The terminal 3 of the Zadj1 and the lower node of the clamp capacitor C1 are connected together. The terminal 4 of the Zadj1 and the lower node of the M1 are connected together. The lower node of the capacitor C1, the lower node of the M1, and the second clamp capacitor C2 are respectively connected to the terminals 11, 12, and 13 of the first middle-cell-1.

The bottom-cell includes a third clamp capacitor C3, a second impedance adjusting unit Zadj2 and a second semiconductor switch M2, in which the Zadj2 has four terminals 1, 2, 3, and 4. The terminal 1 of the Zadj2 and the upper node of the clamp capacitor C3 are connected together. The terminal 2 of the Zadj2 and the upper node of the M2 are connected together. The terminal 3 of the Zadj2, the negative node of the output DC voltage (negative node GND), and the lower node of the capacitor C3 are connected together. The terminal 4 of the Zadj2 and the lower node of the M2 are connected together. The upper node of the capacitor C3 and the upper node of the M2, and the lower node of the M2 are respectively connected to the terminals x4, x5, and x6 of the last middle-cell-x.

Figure 30B:
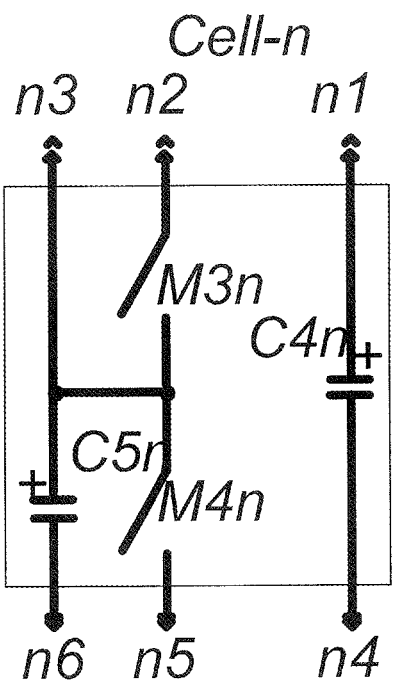

To increase the output voltage, several middle-cells can be inserted between the top-cell and the bottom-cell as shown in FIG. 30(a). Referring to FIG. 30(b), the nth middle-cell Cell-n is realized by two clamping capacitors (C4n and C5n) and two switches (M3n and M4n). Terminals n1 and n2 of the nth middle-cell Cell-n are respectively connected to the upper nodes of the clamping capacitor C4n and the switch M3n. Terminal n3 of the nth middle-cell Cell-n is connected to the lower node of the switch M3n, the upper node of the switch M4n, and the upper node of the clamping capacitor C5n. Terminals n4, n5 and n6 of the nth middle-cell Cell-n are respectively connected to the lower node of the clamping capacitor C4n, the lower node of the switch M4n, and the lower node of the clamping capacitor C5n.

Referring to FIG. 30(a), the terminals n1, n2, and n3 of the nth middle-cell Cell-n are respectively connected to terminals (n−1)4, (n−1)5 and (n−1)6 of the previous middle-cell Cell-(n−1). Moreover, the terminals n4, n5, and n6 of the nth middle-cell Cell-n are respectively connected to terminals (n+1)1, (n+1)2, (n+1)3 of the next middle-cell Cell-(n+1). If more than two middle-cells are sequentially connected between the top-cell and the bottom-cell, the terminals 4 and 5 of each middle-cell are connected together. However, this connection doesn't apply to the last middle-cell (Cell-x).

The switches shown in FIG. 30(a) and FIG. 30(b) with n middle-cells are divided into two sets; M1-M31-M32- . . . -M3n and M2-M41-M42- . . . -M4n. The switches in same set are turned on and turned off simultaneously.

Figure 30C:
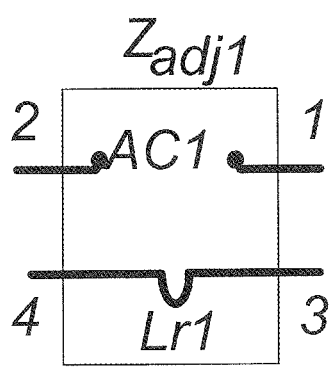

By using the configuration of the Zadj1 and the Zadj2 as shown in FIG. 30(c), FIG. 30(a) is the first member of the soft-switching low out current ripple inversion circuit of the present invention. As shown, the AC1 voltage is connected between the terminals 1 and 2 of the Zadj1. The first inductor Lr1 is connected between the terminals 3 and 4 of the Zadj1. The second inductor Lr2 is connected between the terminals 1 and 2 of the Zadj2 and the AC2 voltage is connected between the terminals 3 and 4 of the Zadj2. The Lr1 and the Lr2 can be implemented with two separate inductors or a two-winding coupling inductor.

Figure 30D:
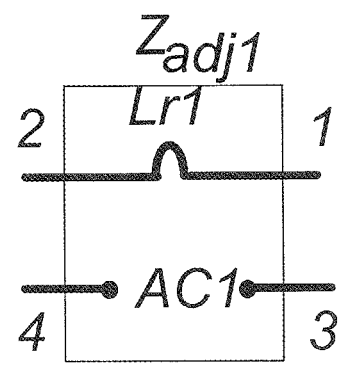
Figure 30D:
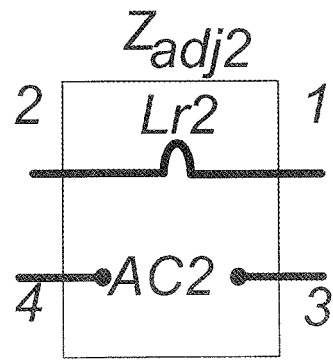
Figure 30D:
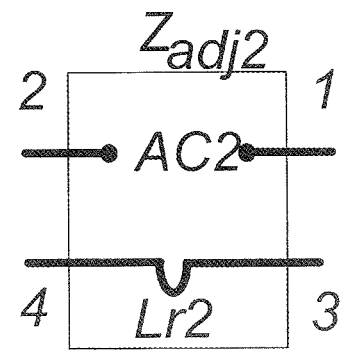

By using the configuration of the Zadj1 and the Zadj2 as shown in FIG. 30(d), FIG. 30(a) is the second member of the soft-switching low out current ripple inversion circuit of the present invention. As shown, the first inductor Lr1 is connected between the terminals 1 and 2 of the Zadj1. The AC1 voltage is connected between the terminals 3 and 4 of the Zadj1. The AC2 voltage is connected between the terminals 1 and 2 of the Zadj2 and the second inductor Lr2 is connected between the terminals 3 and 4 of the Zadj2. The Lr1 and the Lr2 can be implemented with two separate inductors or a two-winding coupling inductor.

Figure 31A:
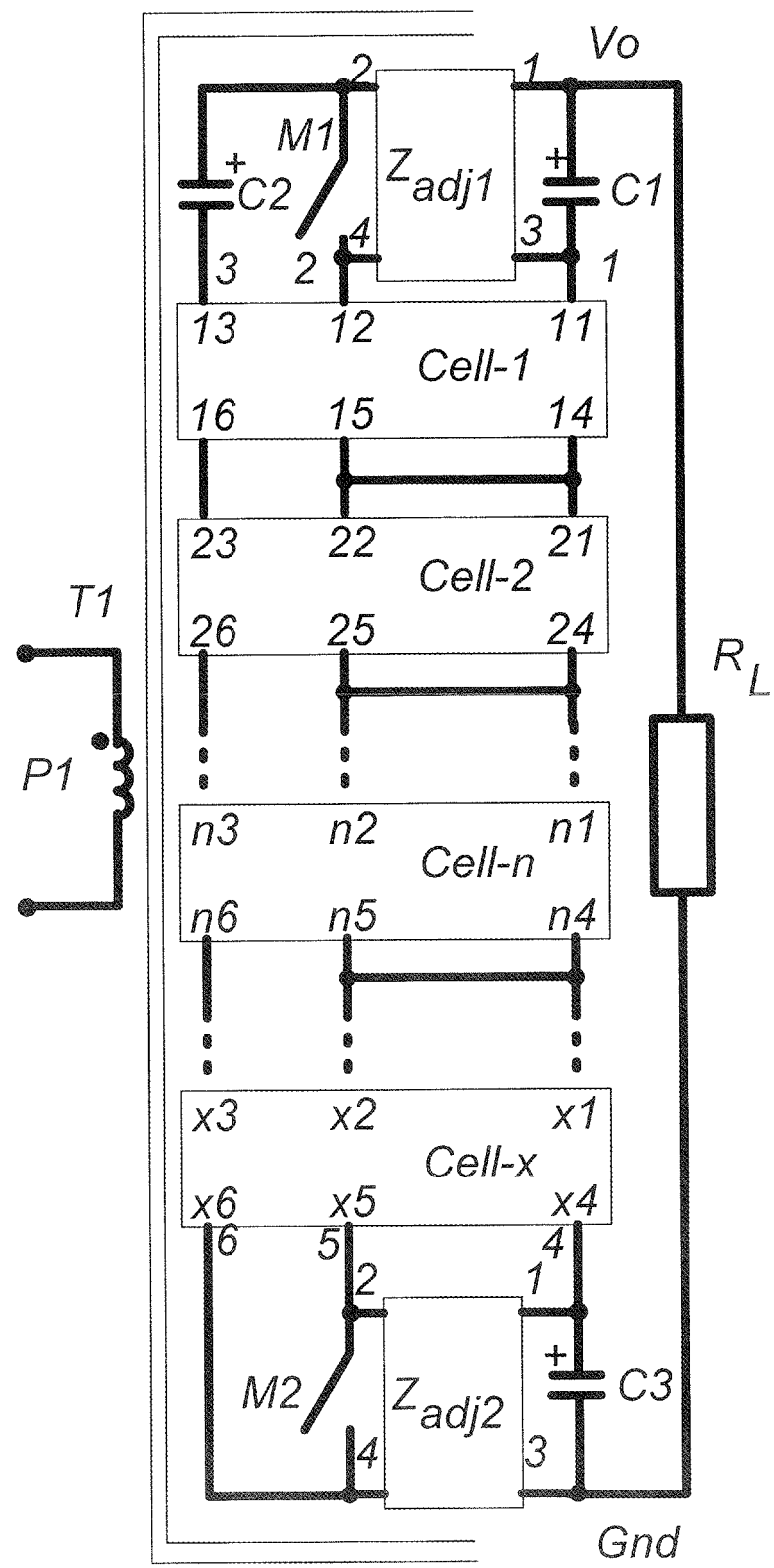
FIG. 31(a) to FIG. 31(e) is the circuit diagram of a single-transformer soft-switching AC-DC rectification circuit and its sub-circuit of nth middle-cell Cell-n applied thereto according to a sixth embodiment of the present invention.

A family of single-transformer soft-switching low output current-ripple rectification circuit as the sixth embodiment of the present invention is illustrated in FIG. 31(a). The circuit includes one top-cell (having four terminals labeled as in, 1, 2, 3, and 4), without or with several middle-cells (in which nth middle-cell is labeled as Cell-n and has six terminals labeled as n1, n2, n3, n4, n5, and n6) and one bottom-cell (having four terminals labeled as GND, 4, 5, and 6) series-connected sequentially. Without middle-cell, the top-cell is series connected to the bottom-cell. On the other hand, several middle-cells (Cell-1~Cell-x) can be inserted between the top-cell and the bottom-cell to reduce the voltage stress of the switches as shown in FIG. 31(a).

As shown, the top-cell includes two clamping capacitors (C1 and C2), the first impedance adjusting unit Zadj1 and the first semiconductor switch M1, in which Zadj1 has four terminals 1, 2, 3, and 4. The terminal 1 of the Zadj1, the positive node of the output DC voltage (positive node Vo), and the upper node of the capacitor C1 are connected together. The terminal 2 of the Zadj1, the upper nodes of the M1 and the clamp capacitor C2 are connected together. The terminal 3 of the Zadj1 and the lower terminal of the clamp capacitor C1 are connected together. The terminal 4 of the Zadj1 and the lower node of the M1 are connected together. The lower nodes of the capacitor C1, the M1, and the second clamp capacitor C2 are respectively connected to the terminals 11, 12, and 13 of the first middle-cell-1.

The bottom-cell includes a third clamp capacitor C3, a second impedance adjusting unit Zadj2 and a second semiconductor switch M2, in which the Zadj2 has four terminals 1, 2, 3, and 4. The terminal 1 of the Zadj2 and the upper node of the clamp capacitor C3 are connected together. The terminal 2 of the Zadj2 and the upper node of the M2 are connected together. The terminal 3 of the Zadj2, the negative node of the output DC voltage (negative node GND), and the lower node of the capacitor C3 are connected together. The terminal 4 of the Zadj2 and the lower node of the M2 are connected together. The upper nodes of the capacitor C3 and the M2, and the lower node of the M2 are respectively connected to the terminals x4, x5, and x6 of the last middle-cell-x.

Figure 31B:
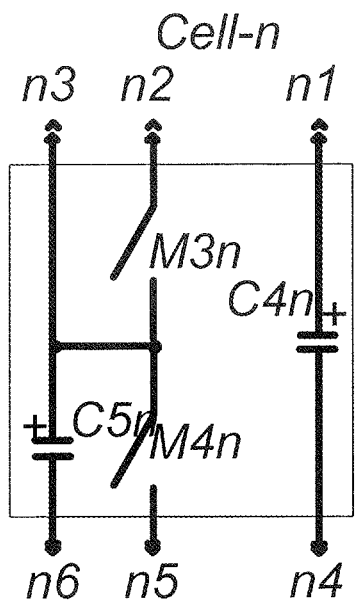

To increase the output voltage, several middle-cells Cell-1~Cell-x can be inserted between the top-cell and the bottom-cell as shown in FIG. 31(a). Referring to FIG. 31(b), the nth middle-cell Cell-n is realized by two clamping capacitors (C4n and C5n) and two switches (M3n and M4n). Terminals n1 and n2 of the nth middle-cell Cell-n are respectively connected to the upper nodes of the clamping capacitor C4n and the switch M3n. Terminal n3 of the nth middle-cell Cell-n is connected to the lower node of the switch M3n, the upper node of the switch M4n, and the upper node of the clamping capacitor C5n. Terminals n4, n5 and n6 of the nth middle-cell Cell-n are respectively connected to the lower node of the clamping capacitor C4n, the lower node of the switch M4n, and the lower node of the clamping capacitor C5n.

Referring to FIG. 31(a), the terminals n1, n2, and n3 of the nth middle-cell Cell-n are respectively connected to terminals (n−1)4, (n−1)5 and (n−1)6 of the previous middle-cell Cell-(n−1). Moreover, the terminals n4, n5, and n6 of the nth middle-cell Cell-n are respectively connected to terminals (n+1)1, (n+1)2, (n+1)3 of the next middle-cell Cell-(n+1). If more than two middle-cells are sequentially connected between the top-cell and the bottom-cell, the terminals 4 and 5 of each middle-cell are connected together. However, this connection doesn't apply to the last middle-cell (Cell-x).

The switches shown in FIG. 31(a) and FIG. 31(b) with n middle-cells are divided into two sets; M1-M31-M32- . . . -M3n and M2-M41-M42- . . . -M4n. The switches in same set are turned on and turned off simultaneously.

As shown in FIG. 31(a), a single transformer T1 includes two identical primary windings P1 and P2 and at least one secondary winding S1 in which the first primary winding P1 and the second primary winding P2 have the same number of turns. The first inductor Lr1 and the second inductor Lr2 represent the respective leakage inductance of the secondary windings S1 and S2.

Figure 31C:
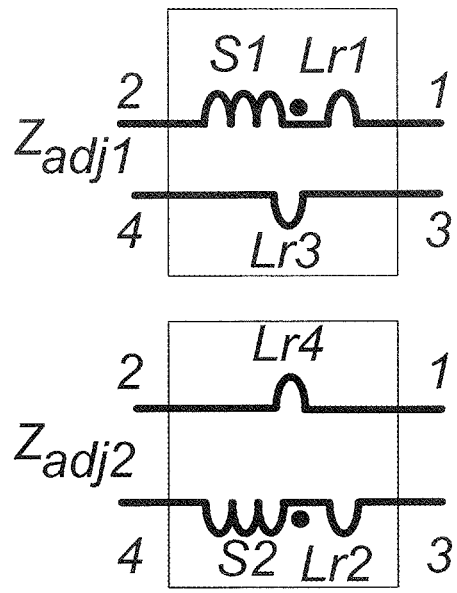
Figure 31D:
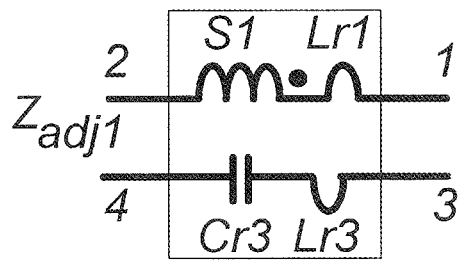
Figure 31D:
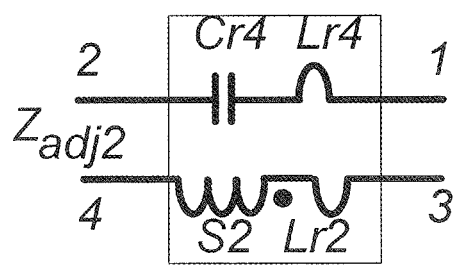
Figure 31E:
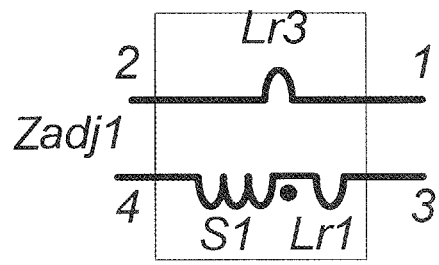
Figure 31E:
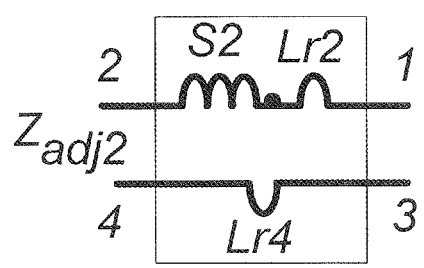

To achieve substantial ripple reduction and a wide ZCS operating range, two larger identical leakage inductances Lr1 and Lr2 are required. However, it is difficult to implement the required leakage inductance during transformer construction. Therefore, minimizing each leakage inductance with adding external large resonant inductor, Lr3 and Lr4, is a more practical solution as shown in FIG. 31(c) to FIG. 31(e). Moreover, a sixth capacitor Cr3 and a seventh capacitor Cr4 are also needed.

By using the configuration of the Zadj1 and the Zadj2 as shown in FIG. 31(c), FIG. 31(a) is the first member of the single-transformer soft-switching low output current-ripple rectification circuit of the present invention. As shown, the Lr1 and S1 are series-connected between the terminals 1 and 2 of the Zadj1. The third inductor Lr3 is connected between the terminals 3 and 4 of the Zadj1. The fourth inductor Lr4 is connected between the terminals 1 and 2 of the Zadj2. The Lr2 and S2 are series-connected between the terminals 3 and 4 of the Zadj2. The Lr3 and the Lr4 can be implemented with two separate inductors or a two-winding coupling inductor.

By using the configuration of the Zadj1 and the Zadj2 as shown in FIG. 31(d), FIG. 31(a) is the second member of the single-transformer soft-switching low output current-ripple rectification circuit of the present invention. As shown, the Lr1 and S1 are series-connected between the terminals 1 and 2 of the Zadj1. The third inductor Lr3 and the sixth capacitor Cr3 are connected between the terminals 3 and 4 of the Zadj1. The fourth inductor Lr4 and seventh capacitor Cr4 are connected between the terminals 1 and 2 of the Zadj2. The Lr2 and S2 are series-connected between the terminals 3 and 4 of the Zadj2. The Lr3 and the Lr4 can be implemented with two separate inductors or a two-winding coupling inductor.

By using the configuration of the Zadj1 and the Zadj2 as shown in FIG. 31(e), FIG. 31(a) is the third member of the single-transformer soft-switching low output current-ripple rectification circuit of the present invention. As shown, the third inductor Lr3 is connected between the terminals 1 and 2 of the Zadj1. The Lr1 and S1 are series-connected between the terminals 3 and 4 of the Zadj1. The Lr2 and S2 are series-connected between the terminals 1 and 2 of the Zadj2. The fourth inductor Lr4 is connected between the terminals 3 and 4 of the Zadj2. The Lr3 and the Lr4 can be implemented with two separate inductors or a two-winding coupling inductor.

Three implementations of the AC-DC rectification circuit, with none or one or more middle-cell inserted between the top-cell and bottom-cell are possible for different output voltage and power applications.

The first AC-DC rectification circuit is realized with series-connected the top-cell and the bottom-cell. The Lr3 and/or Cr3 in the Zadj1 and the Lr4 and/or Cr4 of the Zadj2 can be shared as an inductor Lr and/or a capacitor Cr.

The second AC-DC rectification circuit is realized with the top-cell, one middle-cell, and the bottom-cell connected in series. The Lr3 and/or Cr3 in the Zadj1 and the Lr4 and/or Cr4 of the Zadj2 can be realized with the configurations as shown in FIG. 31(c) to FIG. 31(e).

The third AC-DC rectification circuit is realized with the top-cell, n (n≥2) middle-cells, and the bottom-cell connected in series. Besides the connection among the top-cell, middle-cells, and bottom-cell, the terminals 14 and 15 of the first middle-cell, the terminals 24 and 25 of the second middle-cell, and up to the terminals (n−1)4 and (n−1)5 of the (n−1) middle-cell are connected together. The Lr3 and/or Cr3 in the Zadj1 and the Lr4 and/or Cr4 of the Zadj2 can be realized with the configurations as shown in FIG. 31(c) to FIG. 31(e).

Figure 32A:
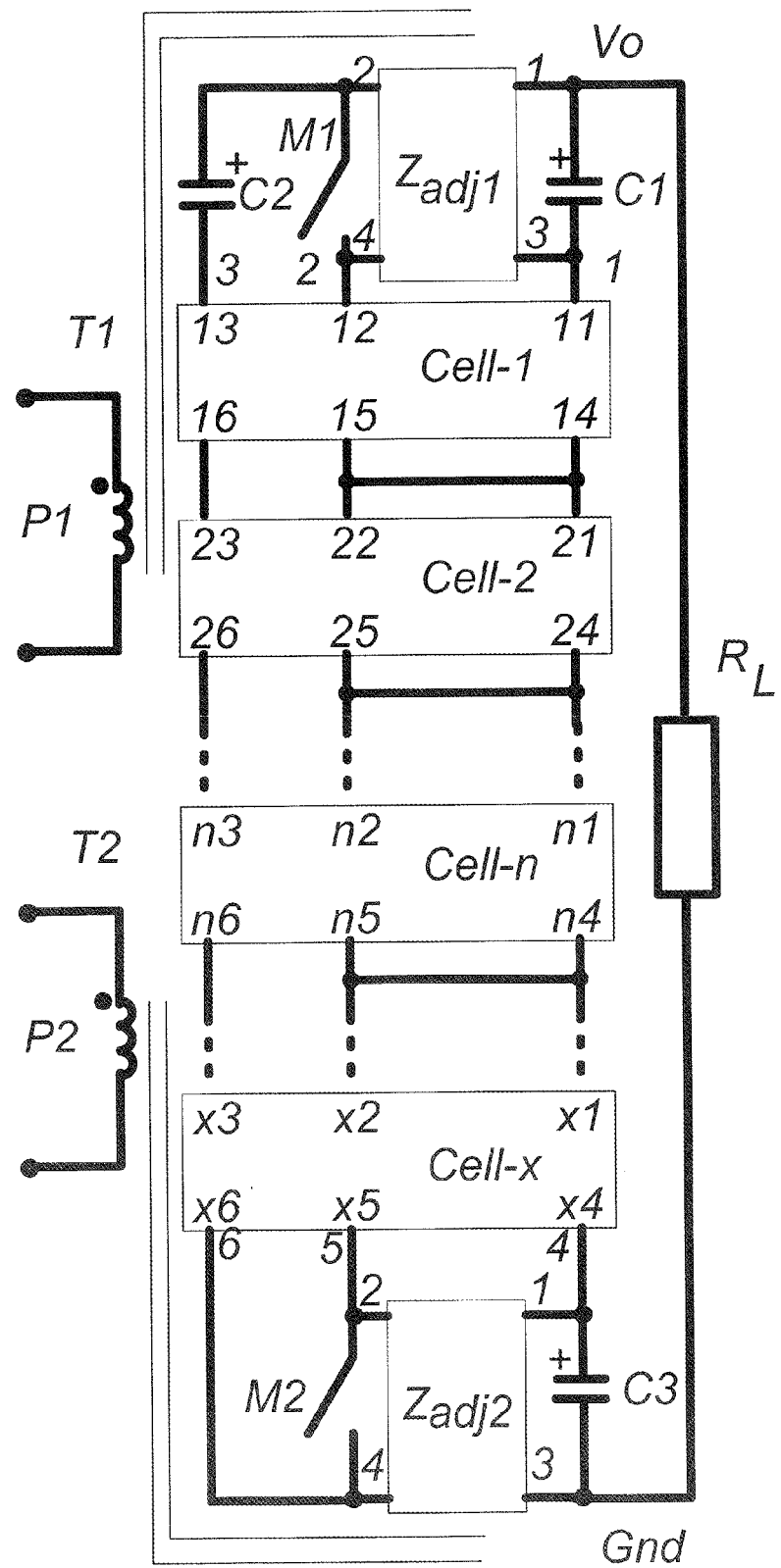
FIG. 32(a) to FIG. 32(e) is the circuit diagram of a two-transformer soft-switching AC-DC rectification circuit with its sub-circuits of nth middle-cell Cell-n applied thereto according to a sixth embodiment of the present invention.
Figure 32B:
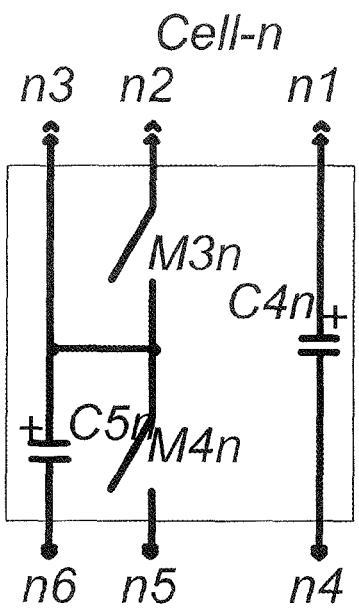
Figure 32C:
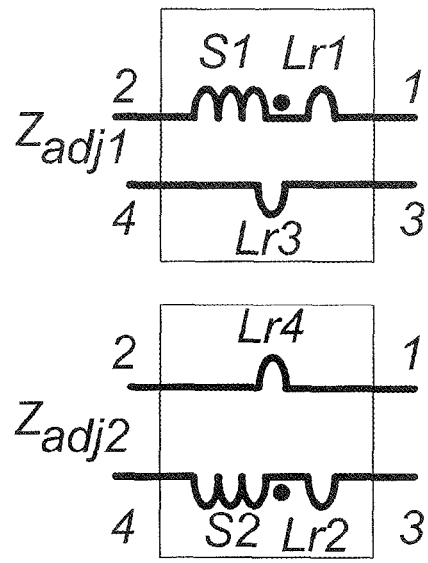
Figure 32D:
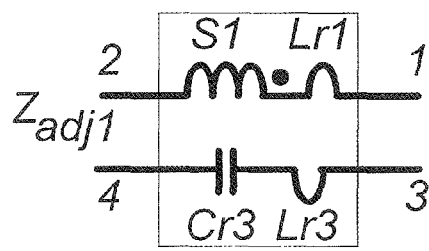
Figure 32D:
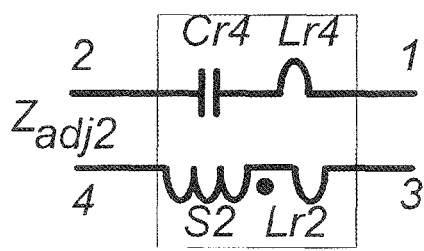
Figure 32E:
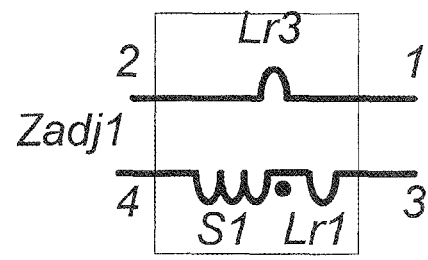
Figure 32E:
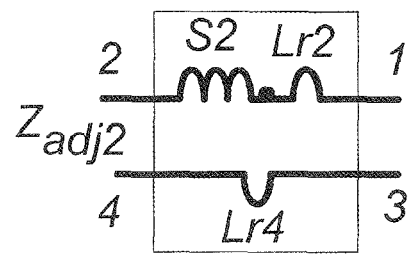

To increase the output power, moreover, the single transformer T1 can be replaced with two transformers T1 and T2. Each transformer has one primary winding and at least one secondary winding being electrically connected in parallel or series to produce the AC output as shown in FIG. 32(a). The inductor Lr1 (Lr2) represents the leakage inductance of secondary winding S1 (S2).

Because all circuits in FIG. 30(a), FIG. 31(a) and FIG. 32(a) share the same operating characteristics, consequently, the fifth embodiment and the sixth embodiment of the present invention will be disclosed by using a single transformer AC-DC rectification circuits only.

Figure 33:
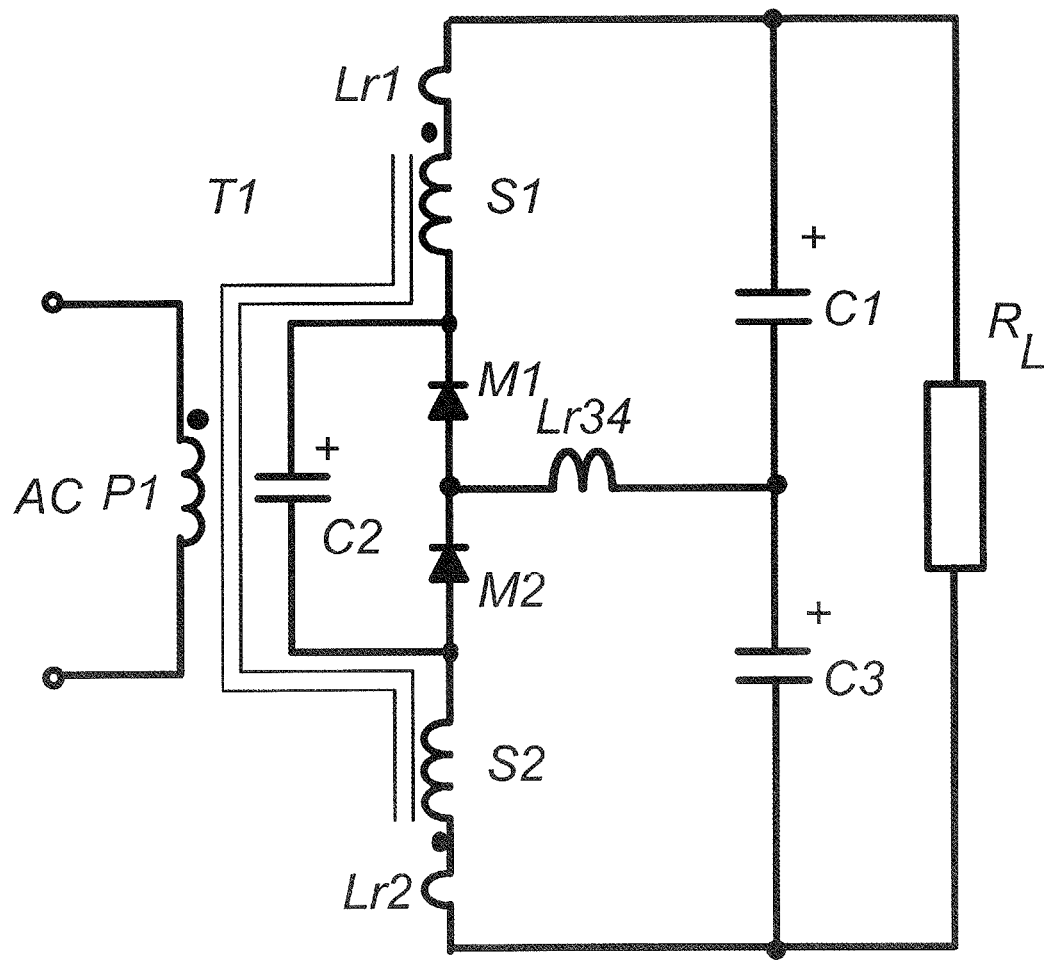
FIG. 33 is an example circuit diagram of the AC-DC rectification circuit shown in FIG. 31(a) with FIG. 31(c) sub-circuit and without middle-cell.

In accordance with the present invention, one embodiment of the rectifier circuit and its operating stages are illustrated as shown in FIG. 33 and FIG. 34, respectively. As an application example, the rectifier circuit is constructed with diodes M1, M2, shown in FIG. 33. These are equivalent to the switches M1, M2 shown in FIG. 31(a). Assumed the clamping capacitors C1 and C3 are identical so that the voltage of each capacitor is equal to one-half output voltage Vo.

The input AC voltage provided by the primary winding P1 of the transformer T1 is coupled to the first and second secondary windings S1 and S2 to generate an AC voltage. Thus, as shown in FIG. 34(a) to FIG. 34(d), the diodes M1 and M2 are forward-biased to be turned on or reversed-biased to be turned off alternatively. There are four operation stages within one switching cycle during steady-state operation.

Figure 34A:
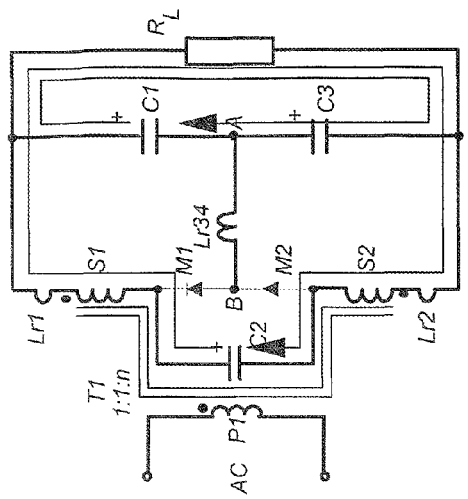
FIG. 34(a) to FIG. 34(d) shows the equivalent circuit of the AC-DC rectification circuit shown in FIG. 33 when the switches are turned on and turned off, respectively.

As shown in FIG. 34(a), the diode M1 is forward-biased by the first and second secondary windings S1 and S2 during the first time interval. The first and second secondary windings S1 and S2 charge and discharge the capacitors via the following routes labeled by the marks of the elements thereof sequentially:
(1) S1(dot)-Lr1-C1-Lr34-M1-S1(non-dot);
(2) S1(dot)-Lr1-$R_L$-C3-Lr34-M1-S1(non-dot); and
(3) S2(dot)-Lr2-C3-Lr34-M1-C2-S2(non-dot),
in which the capacitors C1 and C2 are charged while the capacitors C3 is discharged during the first time interval.

Figure 34B:
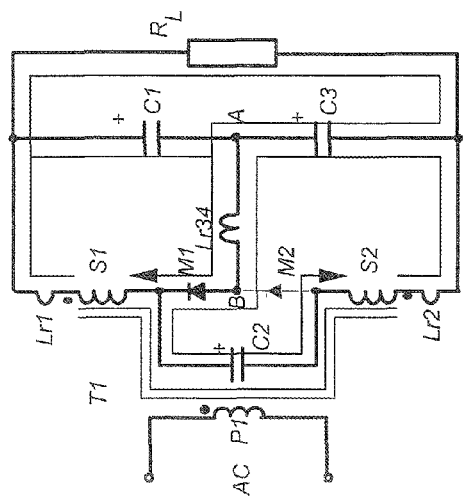

As shown in FIG. 34(b), the diode M1 is reversed-biased by the first and second secondary windings S1 and S2 during a second time interval. Because the load currents are gradually commutated by the clamping capacitor $I_{C2}$, the diode M1 operates with ZCS condition. Due to the leakage energies being absorbed, the voltage waveforms of the diode M1 has no voltage spike and its voltage stress is limited to the output voltage. The average voltage across C2 is equal to output voltage and the average voltages across C1 and C3 are equal to one-half output voltage.

Figure 34C:
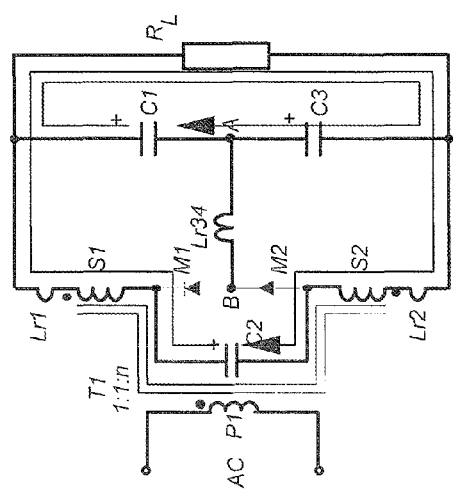

As shown in FIG. 34(c), the diode M2 is forward-biased by the first and second secondary windings S1 and S2 during a third time interval. The first and second secondary windings S1 and S2 charge and discharge the capacitors via the following routes labeled by the marks of the elements thereof sequentially:
(1) S1(non-dot)-C2-M2-Lr34-C1-Lr1-S1(dot);
(2) S2(non-dot)-M2-Lr34-C1-$R_L$-Lr2-S2(dot); and
(3) S2(non-dot)-M2-Lr34-C3-Lr2-S2(dot),
in which the capacitors C3 and C2 are charged while the capacitors C1 is discharged during the third time interval.

Figure 34D:
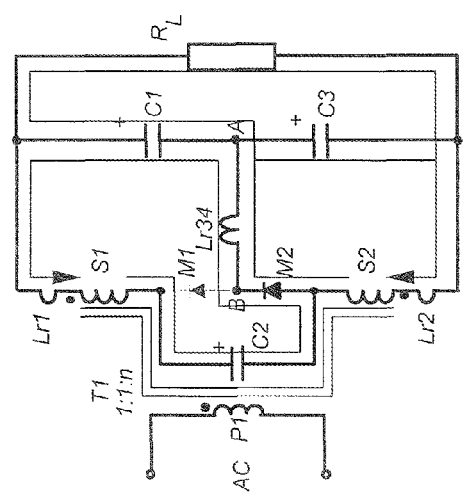

As shown in FIG. 34(d), the diode M2 is reversed-biased by the first and second secondary windings S1 and S2 during a fourth time interval. Because the load currents are gradually commutated by the clamping capacitor $I_{C2}$, the diode M2 operates with ZCS condition. Due to the leakage energies being absorbed, the voltage waveforms of the diode M2 has no voltage spike and its voltage stress is limited to the output voltage. The average voltage across C2 is equal to output voltage and the average voltages across C1 and C3 are equal to one-half output voltage.

Figure 35:
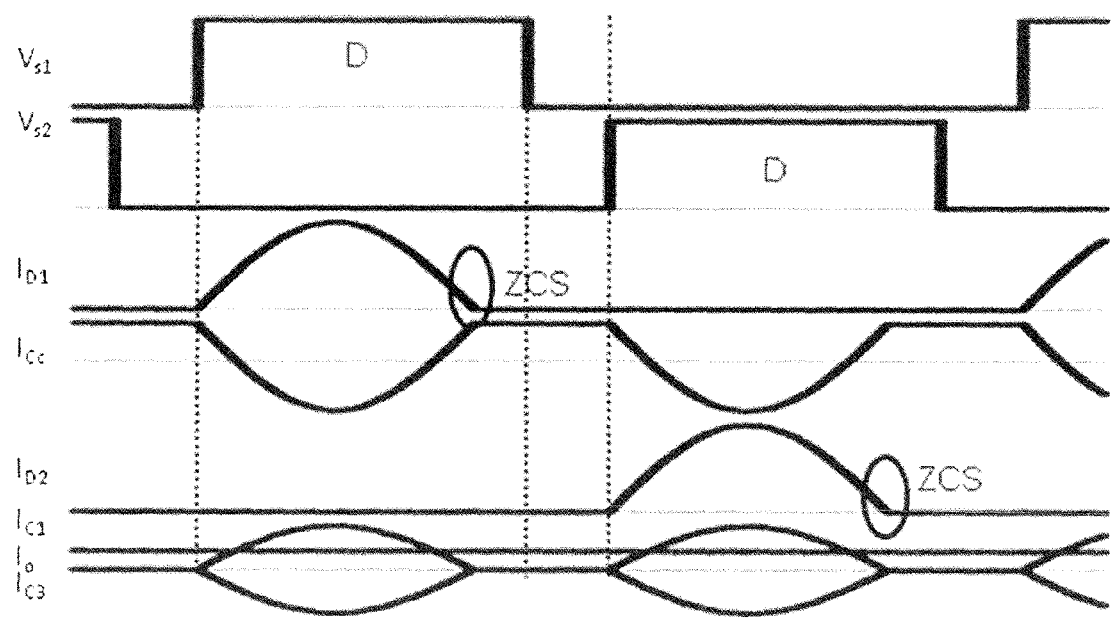
FIG. 35 shows several key waveforms of the circuit shown in FIG. 33.

Several key waveforms of the power rectification circuit of the example of the sixth embodiment of the present invention are shown in FIG. 35. These waveforms are obtained by using simulation program SIMPLIS. As shown, most of the output currents are provided by the clamping capacitor Cc resulting in having small output filter capacitor current ripple $I_{C1}$ and $I_{C2}$. In addition, the $I_{D1}$ and $I_{D2}$ are commutated with the current through the clamping capacitor $I_{Cc}$ during D1 or D2 turn-off time interval. Consequently, both diodes are turned off with ZCS operating condition.

In the embodiment of FIG. 30(a), FIG. 31(a) and FIG. 32(a), the diodes are used as rectifiers. However, as an enhancement of the embodiment to improve the efficiency, the rectifiers may be, for example, synchronous rectifiers or a combination of diode and synchronous rectifier.

In the embodiments shown herein, the switching functions can be performed by any suitable devices known in the art, or later developed. In the preferred first and second embodiments, field-effect transistors are used, however the power rectification circuits may also use other appropriate switch devices such as bipolar transistors, IGBTs, or even electromechanical switch. The rectifier diodes in the rectification circuits of the third to fifth embodiments of the present invention, other appropriate switch devices such as field-effect transistors, bipolar transistors, IGBTs, or even electromechanical switch may be used instead.

Although the embodiments of the present invention are disclosed to be key part of the power inversion circuits. However, it can be combined with topologies of the prior art. For instance, the rectification by the embodiment of the present invention and the inversion may be performed by a topology of the prior art, or vise versa. Furthermore, both the inversion and rectification can be performed by the techniques disclosed herein.

While the invention has been described in detail herein, in accordance with certain preferred embodiments, thereof, many modifications and changes thereto may be affected by those skilled in the art. Accordingly, it is intended by the appended claims to cover all such modifications and changes as fall within the true spirit and scope of the invention.

What is claimed is:

1. A soft-switching and low input current ripple power inversion circuit for converting a DC voltage received at a DC input to an AC voltage, which is paralleled-connected with the DC input, and the soft-switching and low input current ripple power inversion circuit comprising:

a top-cell comprising a first capacitor, a second capacitor, a first switch, and a first impedance adjusting unit, wherein the first impedance adjusting unit has a terminal (1), a terminal (2), a terminal (3) and a terminal (4); the terminal (1) of the first impedance adjusting unit, a positive node of the DC input, and an upper node of the first capacitor are connected together;

the terminal (2) of the first impedance adjusting unit, an upper node of the first switch and an upper node of the second capacitor are connected together;

the terminal (3) and the terminal (4) of the first impedance adjusting unit are respectively connected to a lower node of the first capacitor and a lower node of the first switch;

a bottom-cell comprising a third capacitor, a second switch, and a second impedance adjusting unit, wherein the second impedance adjusting unit has a terminal (1), a terminal (2), a terminal (3) and a terminal (4);

the terminal (1), the terminal (2) and the terminal (4) of the second impedance adjusting unit are respectively connected to an upper node of the third capacitor, an upper node of the second switch, and a lower node of the second switch;

the terminal (3) of the second impedance adjusting unit, a negative node of the DC input, and a lower node of the third capacitor are connected together; and at least one transformer comprising at least one secondary winding magnetically coupled to its corresponding primary winding within the first impedance adjusting unit and the second impedance adjusting unit;

thereby, when the first switch and the second switch are turned on or off alternatively within one switching cycle, the AC voltage is generated at the secondary winding and a soft-switching operation on the switches is performed.

2. The soft-switching and low input current ripple power inversion circuit of claim 1, wherein the lower node of the first capacitor, the lower node of the first switch, and the lower node of the second capacitor of the top-cell are respectively connected to the upper node of the third capacitor, the upper node of the second switch, and the lower node of the second switch of the bottom-cell.

3. The soft-switching and low input current ripple power inversion circuit of claim 2, wherein the first impedance adjusting unit and the second impedance adjusting unit comprise a first inductor, a second inductor, a third inductor, a fourth inductor, a first primary winding and a second primary winding, wherein the first inductor and the second inductor represent the leakage inductance of the first primary winding and the second primary winding, respectively; the first primary winding and the second primary winding are magnetically coupled to its corresponding secondary winding; the first inductor and the first primary winding are series-connected between the terminal (1) and the terminal (2) of the first impedance adjusting unit; the third inductor is connected between the terminal (3) and the terminal (4) of the first impedance adjusting unit; the fourth inductor is connected between the terminal (1) and the terminal (2) of the second impedance adjusting unit; the second inductor and the second primary winding are series-connected between the terminal (3) and the terminal (4) of the second impedance adjusting unit.

4. The soft-switching and low input current ripple power inversion circuit of claim 2, wherein the first impedance adjusting unit and the second impedance adjusting unit comprise a first inductor, a second inductor, a third inductor, a fourth inductor, a fourth capacitor, a fifth capacitor, a first primary winding and a second primary winding, wherein the first inductor and the second inductor represent the leakage inductance of the first primary winding and the second primary winding, respectively; the first primary winding and the second primary winding are magnetically coupled to its corresponding secondary winding; the first inductor and the first primary winding are series-connected between the terminals (1) and the terminal (2) of the first impedance adjusting unit; the third inductor and the fourth capacitor are series-connected between the terminal (3) and the terminal (4) of the first impedance adjusting unit; the fourth inductor and the fifth capacitor are series-connected between the terminal (1) and the terminal (2) of the second impedance adjusting unit; the second inductor and the second primary winding are series-connected between the terminal (3) and the terminal (4) of the second impedance adjusting unit.

5. The soft-switching and low input current ripple power inversion circuit of claim 1, further comprising at least one middle-cell connected between the top-cell and the bottom-cell;

the middle-cell comprising a fourth capacitor, a fifth capacitor, a third switch, and a fourth switch (comprising a terminal (n1), a terminal (n2), a terminal (n3), a terminal (n4), a terminal (n5), and a terminal (n6) for nth middle-cell);

the terminal (n1), the terminal (n2), and the terminal (n4) of the nth middle-cell are respectively connected to the upper node of the fourth capacitor, an upper node of the third switch, and a lower node of the fourth capacitor;

the terminal (n3) of the nth middle-cell is connected to a lower node of the third switch, an upper node of the fourth switch, and an upper node of the fifth capacitor;

the terminal (n5), the terminal (n6) of the nth middle-cell are respectively connected to the lower node of the fourth switch and the lower node of the fifth capacitor;

the lower node of the first capacitor, the lower node of the first switch, and the lower node of the second capacitor of the top-cell are respectively connected to the terminal (n1), the terminal (n2), and the terminal (n3) of the first middle-cell;

the terminal (n1), the terminal (n2), and the terminal (n3) of the nth middle-cell (n≥2) are respectively connected to the terminal (n4), the terminal (n5), and the terminal (n6) of the previous [(n−1)th] middle-cell;

the terminal (n4), the terminal (n5), and the terminal (n6) of the nth middle-cell (n≥2) are respectively connected to the terminal (n1), the terminal (n2), and the terminal (n3) of the next [(n+1)th] middle-cell;

excluded the last middle-cell, the terminal (n4) and the terminal (n5) of each middle-cell is connected together;

the upper node of the third capacitor, the upper node of the second switch, and the lower node of the second switch of the bottom-cell are respectively connected to the terminal (n4), the terminal (n5), and the terminal (n6) of the last middle-cell.

6. The soft-switching and low input current ripple power inversion circuit of claim 5, wherein the first impedance adjusting unit and the second impedance adjusting unit comprise a first inductor, a second inductor, a third inductor, a fourth inductor, a first primary winding and a second primary winding, wherein the first inductor and the second inductor represent the leakage inductance of the first primary winding and the second primary winding, respectively; the first primary winding and the second primary winding are magnetically coupled to its corresponding secondary winding; the first inductor and the first primary winding are series-connected between the terminal (1) and the terminal (2) of the first impedance adjusting unit; the third inductor is connected between the terminal (3) and the terminal (4) of the first impedance adjusting unit; the fourth inductor is connected between the terminal (1) and the terminal (2) of the second impedance adjusting unit; the second inductor and the second primary winding are series-connected between the terminal (3) and the terminal (4) of the second impedance adjusting unit.

7. The soft-switching and low input current ripple power inversion circuit of claim 5, wherein the first impedance adjusting unit and the second impedance adjusting unit comprise a first inductor, a second inductor, a third inductor, a fourth inductor, a sixth capacitor, a seventh capacitor, a first primary winding and a second primary winding, wherein the first inductor and the second inductor represent the leakage inductance of the first primary winding and the second primary winding, respectively; the first primary winding and the second primary winding are magnetically coupled to its corresponding secondary winding; the first inductor and the first primary winding are series-connected between the terminal (1) and the terminal (2) of the first impedance adjusting unit; the third inductor and the sixth capacitor are series-connected between the terminal (3) and the terminal (4) of the first impedance adjusting unit; the fourth inductor and the seventh capacitor are series-connected between the terminal (1) and the terminal (2) of the second impedance adjusting unit; the second inductor and the second primary winding are series-connected between the terminal (3) and the terminal (4) of the second impedance adjusting unit.

8. A soft-switching and low input current ripple power inversion circuit for converting a DC voltage received at a DC input to an AC voltage, which is paralleled-connected with the DC input, and the soft-switching and low input current ripple power inversion circuit comprising a first series circuit, a first impedance adjusting unit, and a second series circuit;

the first series circuit comprising a first capacitor and a third capacitor connected in series;

an upper node of the first capacitor is connected to the positive node of the DC input voltage;

a lower node of the first capacitor is connected to an upper node of the third capacitor;

a lower node of the third capacitor is connected to a negative node of the DC input;

the first impedance adjusting unit comprising a terminal (1), a terminal (2), a terminal (3), a terminal (4), a terminal (5), and a terminal (6);

the second series circuit comprising a first switch, at least one middle-cell, a second switch and a second capacitor;

at least one middle-cell connected between the first switch and the second switch;

the middle-cell comprising a third switch, a fourth switch, and a fourth capacitor comprising a terminal (n1), a terminal (n2), a terminal (n3), and a terminal (n4) for nth middle-cell;

the terminal (n1) of nth middle-cell is connected to an upper node of the third switch and an upper node of the fourth capacitor;

the terminal (n2) and the terminal (n3) of nth middle-cell are respectively connected to a lower node of the third switch and the upper node of the fourth switch;

the terminal (n4) of nth middle-cell is connected to the lower node of the fourth switch and the lower node of the fourth capacitor;

the upper nodes of the first switch and the second capacitor are connected together;

the lower node of the first switch and the upper node of the second switch are respectively connected to terminals (11) and (14) of the first middle-cell;

the lower node of the second switch is connected to the lower node of the second capacitor;

excluded the last (nth) middle-cell, the terminal (n2) and the terminal (n3) of nth middle-cell are respectively connected to the terminal (n1) and the terminal (n4) of the next (n+1)th middle-cell;

the terminal (n2) and the terminal (n3) of the last middle-cell are connected together;

the terminal (1), the terminal (2), the terminal (3), the terminal (4), the terminal (5) and the terminal (6) of the first impedance adjusting unit are respectively connected to the upper node of the first capacitor, the upper node of the first switch, the lower node of the first capacitor, the terminal (n2) of the last middle-cell, the lower node of the third capacitor, and the lower node of the second switch;

at least one transformer comprising at least one secondary winding magnetically coupled to its corresponding primary winding within the first impedance adjusting unit;

thereby, when the switches are turned on or off alternatively within one switching cycle, the AC voltage is generated at the secondary winding and a soft-switching operation on the switches is performed.

9. The soft-switching and low input current ripple power inversion circuit of claim 8, wherein the first impedance adjusting unit comprises a first inductor, a second inductor, a third inductor, a first primary winding and a second primary winding, wherein the first inductor and the second inductor represent the leakage inductance of the first primary winding and the second primary winding, respectively; the first primary winding and the second primary winding are magnetically coupled to its corresponding secondary winding; the first inductor and the first primary winding are connected in series between the terminal (1) and the terminal (2) of the first impedance adjusting unit; the third inductor is connected between the terminal (3) and the terminal (4) of the first impedance adjusting unit; the second inductor and the second primary winding are connected in series between the terminal (5) and the terminal (6) of the first impedance adjusting unit.

10. The soft-switching and low input current ripple power inversion circuit of claim 8, wherein the first impedance adjusting unit comprises a first inductor, a second inductor, a third inductor, a fifth capacitor, a first primary winding and a second primary winding, wherein the first inductor and the second inductor represent the leakage inductance of the first primary winding and the second primary winding, respectively; the first primary winding and the second primary winding are magnetically coupled to its corresponding secondary winding; the first inductor and the first primary winding are series-connected between the terminal (1) and the terminal (2) of the first impedance adjusting unit; the third inductor and the fifth capacitor are series-connected between the terminal (3) and the terminal (4) of the first impedance adjusting unit; the second inductor and the second primary winding are series-connected between the terminal (5) and the terminal (6) of the first impedance adjusting unit.

11. A soft-switching and low output current ripple power rectifier circuit for converting an AC voltage received at a primary winding of a transformer to a DC voltage outputted to a load and comprises a first series circuit, a second series circuit, a third series circuit, and a first capacitor, wherein the first series circuit, the second series circuit and the third series circuit are paralleled-connected; the first series circuit comprising a first inductor, a first secondary winding, and a first switch connected sequentially, wherein the first inductor represents the leakage inductance of the first secondary winding; the second series circuit comprising a second switch, a second secondary winding, and a second inductor connected sequentially, wherein the second inductor represents the leakage inductance of the second secondary winding; the first capacitor connected between a first node within the first series circuit and a second node within the second series circuit, wherein the first node is a center-node of the first secondary winding and the first switch, and wherein the second node is a center-node of the second switch and the second secondary winding; the third series circuit comprising a third inductor and a second capacitor connected sequentially, wherein the second capacitor is connected between the positive node and negative node of the output DC voltage;
at least one transformer comprising at least one primary winding magnetically coupled to its corresponding secondary winding;
thereby, when the switches are turned on or off alternatively within one switching cycle, the DC voltage is generated at the output and a soft-switching operation on the switches is performed.

12. A soft-switching and low output current ripple power rectifier circuit for converting an AC voltage received at a primary winding of a transformer to a DC voltage outputted to a load, which comprises a first series circuit, a second series circuit, a third series circuit, and a first capacitor, wherein the first series circuit, the second series circuit and the third series circuit are paralleled-connected; the first series circuit comprising a first inductor, a first secondary winding, a first switch, and a third switch connected sequentially, wherein the first inductor represents the leakage inductance of the first secondary winding; a non-dot node of the first secondary winding and an upper node of the first switch connected together; the second series circuit comprising a second switch, a fourth switch, a second secondary winding, and a second inductor connected sequentially, wherein the second inductor represents the leakage inductance of the second secondary winding; a lower node of the fourth switch and a non-dot node of the secondary winding connected together; the first capacitor connected between a first node within the first series circuit and a second node within the second series circuit, wherein the first node is the center-node of the first secondary winding and the first switch and the second node is the center-node of the fourth switch and the second secondary winding; a third node within the first series circuit and a fourth node within the second series circuit are connected together, wherein the third node is a center-node of the first switch and the third switch and the fourth node is the center-node of the second switch and the fourth switch; the third series circuit comprising a third inductor and a second capacitor connected sequentially, wherein the second capacitor is connected between a positive node and a negative node of the output DC voltage; and
at least one transformer comprising at least one primary winding magnetically coupled to its corresponding secondary winding;
thereby, when the switches are turned on or off alternatively within one switching cycle, the DC voltage is generated at the output and a soft-switching operation on the switches is performed.

13. A soft-switching and low output current ripple power rectifier circuit for converting an AC voltage to a DC voltage outputted to a load, which is paralleled-connected with the load and comprising:
a top-cell comprising a second capacitor, a first switch, a first impedance adjusting unit, and a first capacitor, wherein the first impedance adjusting unit comprises a terminal (1), a terminal (2), a terminal (3), and a terminal (4);
the terminal (1) of the first impedance adjusting unit, a positive node of the output voltage, and an upper node of the first capacitor are connected together;
the terminal (2) of the first impedance adjusting unit, an upper node of the first switch and an upper node of the second capacitor are connected together;
the terminals (3) and the terminal (4) of the first impedance adjusting unit are respectively connected to a lower node of the first capacitor and a lower node of the first switch;
a bottom-cell comprising a second switch, a second impedance adjusting unit and a third capacitor, wherein the second impedance adjusting unit has a terminal (1), a terminal (2), a terminal (3), and a terminal (4);

the terminal (1), the terminal (2) and the terminal (4) of the second impedance adjusting unit are respectively connected to an upper node of the third capacitor, an upper node of the second switch, and a lower node of the second switch; and the terminal (3) of the second impedance adjusting unit, a negative node of the output voltage, and the lower node of the third capacitor are connected together; and at least one transformer comprising at least one primary winding magnetically coupled to its corresponding secondary winding within the first impedance adjusting unit and the second impedance adjusting unit;

thereby, when the switches are operated with soft-switching to turn-on or turn-off alternatively within one switching cycle, the AC voltage is converted to the required DC voltage to the load.

14. The soft-switching and low output current ripple power rectifier circuit of claim 13, wherein the lower nodes of the first capacitor, the first switch, and the second capacitor of the top-cell are respectively connected to the upper node of the third capacitor, the upper node of the second switch, and the lower node of the second switch of the bottom-cell.

15. The soft-switching and low output current ripple power rectifier circuit of claim 14, wherein the first impedance adjusting unit and the second impedance adjusting unit comprise a first inductor, a second inductor, a third inductor, a fourth inductor, a first secondary winding and a second secondary winding; wherein the first inductor and the second inductor represent the leakage inductance of the first secondary winding and the second secondary winding, respectively; the first secondary winding and the second secondary winding are magnetically coupled to its corresponding primary winding; the first inductor and the first secondary winding are series-connected between the terminal (1) and the terminal (2) of the first impedance adjusting unit; the third inductor is connected between the terminal (3) and the terminal (4) of the first impedance adjusting unit; the fourth inductor is connected between the terminal (1) and the terminal (2) of the second impedance adjusting unit; the second inductor and the second secondary winding are series-connected between the terminal (3) and the terminal (4) of the second impedance adjusting unit.

16. The soft-switching and low output current ripple power rectifier circuit of claim 14, wherein the first impedance adjusting unit and the second impedance adjusting unit comprising a first inductor, a second inductor, a third inductor, a fourth inductor, a fourth capacitor, a fifth capacitor, a first secondary winding and a second secondary winding, wherein the first inductor and the second inductor represent the leakage inductance of the first secondary winding and the second secondary winding, respectively; the first secondary winding and the second secondary winding are magnetically coupled to its corresponding primary winding; the first inductor and the first secondary winding are series-connected between the terminal (1) and the terminal (2) of the first impedance adjusting unit; the third inductor and the fourth capacitor are series-connected between the terminal (3) and the terminal (4) of the first impedance adjusting unit; the fourth inductor and the fifth capacitor are series-connected between the terminal (1) and (2) of the second impedance adjusting unit; the second inductor and the second secondary winding are series-connected between the terminal (3) and the terminal (4) of the second impedance adjusting unit.

17. The soft-switching and low output current ripple power rectifier circuit of claim 13, also comprising at least one middle-cell connected between the top-cell and the bottom-cell;

the middle-cell comprising a fifth capacitor, a third switch, a fourth switch, and a fourth capacitor, comprising a terminal (n1), a terminal (n2), a terminal (n3), a terminal (n4), a terminal (n5), and a terminal (n6) for nth middle-cell;

the terminal (n1), the terminal (n2), and the terminal (n4) of the nth middle-cell are respectively connected to an upper node of the fourth capacitor, an upper node of the third switch, and a lower node of the fourth capacitor;

the terminal (n3) of the nth middle-cell is connected to a lower node of the third switch, an upper node of the fourth switch, and an upper node of the fifth capacitor;

the terminal (n5), the terminal (n6) of the nth middle-cell Cell-n are respectively connected to a lower node of the fourth switch and a lower node of the fifth capacitor;

the lower node of the first capacitor, the lower node of the first switch, and the lower node of the second capacitor of the top-cell are respectively connected to the terminal (n1), the terminal (n2), and the terminal (n3) of the first middle-cell;

the terminal (n1), terminal (n2), and terminal (n3) of the nth middle-cell (n≥2) are respectively connected to the terminal (n4), the terminal (n5), and the terminal (n6) of the previous [(n−1)th] middle-cell;

the terminal (n4), the terminal (n5), and the terminal (n6) (n≥2) of the nth middle-cell are connected to the terminal (n1), the terminal (n2), and the terminal (n3) of the next [(n+1)th] middle-cell;

excluded the last middle-cell, the terminal (n4) and the terminal (n5) of each middle-cell are connected together;

the upper node of the third capacitor, the upper node of the second switch, and the lower node of the second switch of the bottom-cell are respectively connected to the terminal (n4), the terminal (n5), and the terminal (n6) of the last middle-cell.

18. The soft-switching and low output current ripple power rectifier circuit of claim 17, wherein the first impedance adjusting unit and the second impedance adjusting unit comprising a first inductor, a second inductor, a third inductor, a fourth inductor, a first secondary winding and a second secondary winding; wherein the first inductor and the second inductor represent the leakage inductance of the first secondary winding and the second secondary winding, respectively; the first secondary winding and the second secondary winding are magnetically coupled to its corresponding primary winding; the first inductor and the first secondary winding are series-connected between the terminal (1) and the terminal (2) of the first impedance adjusting unit; the third inductor is connected between the terminal (3) and the terminal (4) of the first impedance adjusting unit; the fourth inductor is connected between the terminal (1) and the terminal (2) of the second impedance adjusting unit; the second inductor and the second secondary winding are series-connected between the terminal (3) and the terminal (4) of the second impedance adjusting unit.

19. The soft-switching and low input current ripple power rectifier circuit of claim 17, wherein the first impedance adjusting unit and the second impedance adjusting unit comprising a first inductor, a second inductor, a third inductor, a fourth inductor, a sixth capacitor, a seventh capacitor, a first secondary winding and a second secondary winding, wherein the first inductor and the second inductor represent the leakage inductance of the first secondary winding and the second secondary winding, respectively; the first secondary winding and the second secondary winding are magnetically coupled to its corresponding primary winding; the first inductor and the first secondary winding are series-connected between the terminal (1) and the terminal (2) of the first impedance adjusting unit; the third inductor and the sixth capacitor are series-connected between the terminal (3) and the terminal (4) of the first impedance adjusting unit; the fourth inductor and the seventh capacitor are series-connected between the terminal (1) and the terminal (2) of the second impedance adjusting unit; the second inductor and the second secondary winding are series-connected between the terminal (3) and the terminal (4) of the second impedance adjusting unit.

* * * * *